(12) United States Patent
Sasaki et al.

(10) Patent No.: US 12,350,809 B2
(45) Date of Patent: Jul. 8, 2025

(54) ELECTRIC WORK MACHINE

(71) Applicant: MAKITA CORPORATION, Anjo (JP)

(72) Inventors: Yoshinori Sasaki, Anjo (JP); Takao Kuroyanagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 287 days.

(21) Appl. No.: 18/155,843

(22) Filed: Jan. 18, 2023

(65) Prior Publication Data

US 2023/0302622 A1 Sep. 28, 2023

(30) Foreign Application Priority Data

Mar. 23, 2022 (JP) ................................ 2022-046442

(51) Int. Cl.
*H02K 7/14* (2006.01)
*B25F 5/02* (2006.01)
*H02K 3/52* (2006.01)
*H02K 5/16* (2006.01)
*H02K 9/06* (2006.01)

(52) U.S. Cl.
CPC .............. *B25F 5/02* (2013.01); *H02K 3/522* (2013.01); *H02K 7/145* (2013.01); *H02K 9/06* (2013.01)

(58) Field of Classification Search
CPC ............ H02K 7/00; H02K 7/08; H02K 7/083; H02K 7/14; H02K 7/145; H02K 5/00; H02K 5/16; H02K 5/161; H02K 5/17; H02K 5/173; H02K 5/1732; B25B 21/00; B25B 21/02; B25B 21/002; B25B 21/026; B25F 5/001; B25F 5/02
See application file for complete search history.

(56) References Cited

U.S. PATENT DOCUMENTS

| | | | | |
|---|---|---|---|---|
| 2,396,007 A | * | 3/1946 | Happe | B23B 45/001 310/50 |
| 6,018,205 A | * | 1/2000 | Ohashi | H02K 9/223 310/58 |
| 2019/0311951 A1 | | 10/2019 | Nishida et al. | |
| 2020/0366161 A1 | | 11/2020 | Sasaki | |
| 2020/0396089 A1 | | 12/2020 | Guo et al. | |

FOREIGN PATENT DOCUMENTS

| | | | |
|---|---|---|---|
| EP | 0552378 A1 * | 7/1993 | ............... H02K 5/14 |
| JP | 2020-185652 A | 11/2020 | |

* cited by examiner

*Primary Examiner* — Tran N Nguyen
(74) *Attorney, Agent, or Firm* — Oliff PLC

(57) ABSTRACT

An electric work machine reduces noise from the electric work machine. An electric work machine includes a motor including a stator including a stator core and coils, and a rotor including a rotor core and a rotor shaft, an output unit located frontward from the motor and rotatable with a rotational force from the motor, a first support having a first contact surface in contact with a front end face of the stator core, a second support having a second contact surface in contact with a rear end face of the stator core, and a screw connecting the first support and the second support and fastening the stator core to the first support and the second support in a front-rear direction.

20 Claims, 20 Drawing Sheets

ELECTRIC WORK MACHINE

CROSS-REFERENCE TO RELATED APPLICATIONS

This application claims the benefit of priority to Japanese Patent Application No. 2022-046442, filed on Mar. 23, 2022, the entire contents of which are hereby incorporated by reference.

BACKGROUND

1. Technical Field

The present disclosure relates to an electric work machine.

2. Description of the Background

In the technical field of electric work machines, a known electric work machine is described in, for example, Japanese Unexamined Patent Application Publication No. 2020-185652.

BRIEF SUMMARY

An electric work machine may generate noise that can cause discomfort to an operator using the electric work machine as well as to people nearby.

One or more aspects of the present disclosure are directed to an electric work machine that reduces noise from the electric work machine.

A first aspect of the present disclosure provides an electric work machine, including:
- a motor including
  - a stator including a stator core and coils attached to the stator core, and
  - a rotor including a rotor core and a rotor shaft fixed to the rotor core;
- an output unit located frontward from the motor and rotatable with a rotational force from the motor;
- a first support having a first contact surface in contact with a front end face of the stator core;
- a second support having a second contact surface in contact with a rear end face of the stator core; and
- a screw connecting the first support and the second support and fastening the stator core to the first support and the second support in a front-rear direction.

A second aspect of the present disclosure provides an electric work machine, including:
- a motor including
  - a stator including a stator core and coils attached to the stator core, and
  - a rotor including a rotor core and a rotor shaft fixed to the rotor core;
- an output unit located frontward from the motor and rotatable with a rotational force from the motor;
- a first support located at a front end of the stator core, the first support comprising a metal;
- a second support located at a rear end of the stator core, the second support comprising a metal; and
- a screw connecting the first support and the second support.

The electric work machine according to the above aspects of the present disclosure reduces noise from the electric work machine.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine.

The electric work machine includes a motor. In the embodiments, a direction parallel to a rotation axis AX of the motor is referred to as an axial direction for convenience. A direction about the rotation axis AX is referred to as a circumferential direction or circumferentially, or a rotation direction, and a direction radial from the rotation axis AX is referred to as a radial direction or radially for convenience.

In the embodiments, the rotation axis AX extends in a front-rear direction. The axial direction corresponds to the front-rear direction. The axial direction is from the front to the rear or from the rear to the front. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

The electric work machine according to the embodiment is a driver drill, which is an example of a drilling work machine or a screwing work machine.

Overview of Driver Drill

Figure 1:
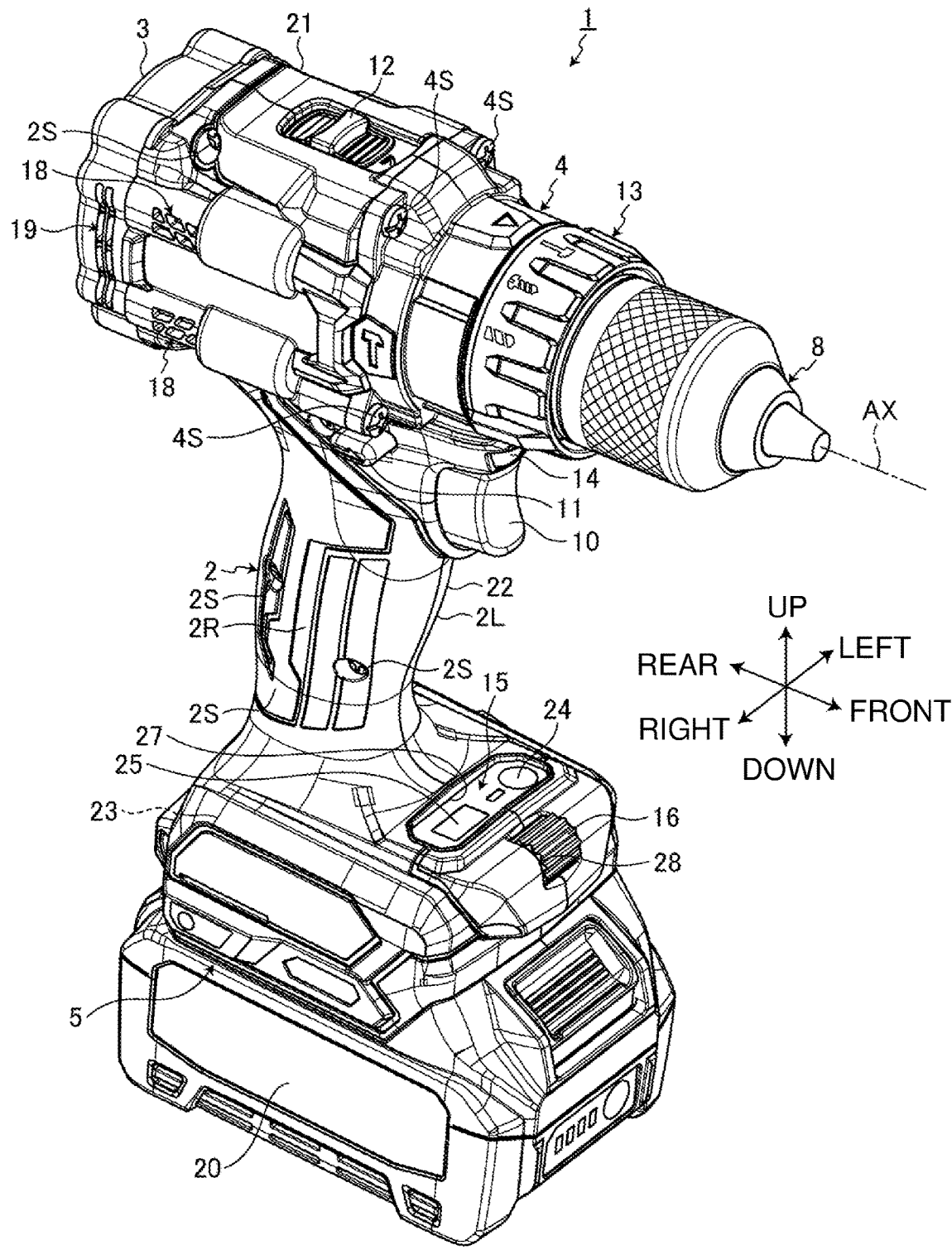
FIG. 1 is a front perspective view of a driver drill according to an embodiment.
Figure 2:
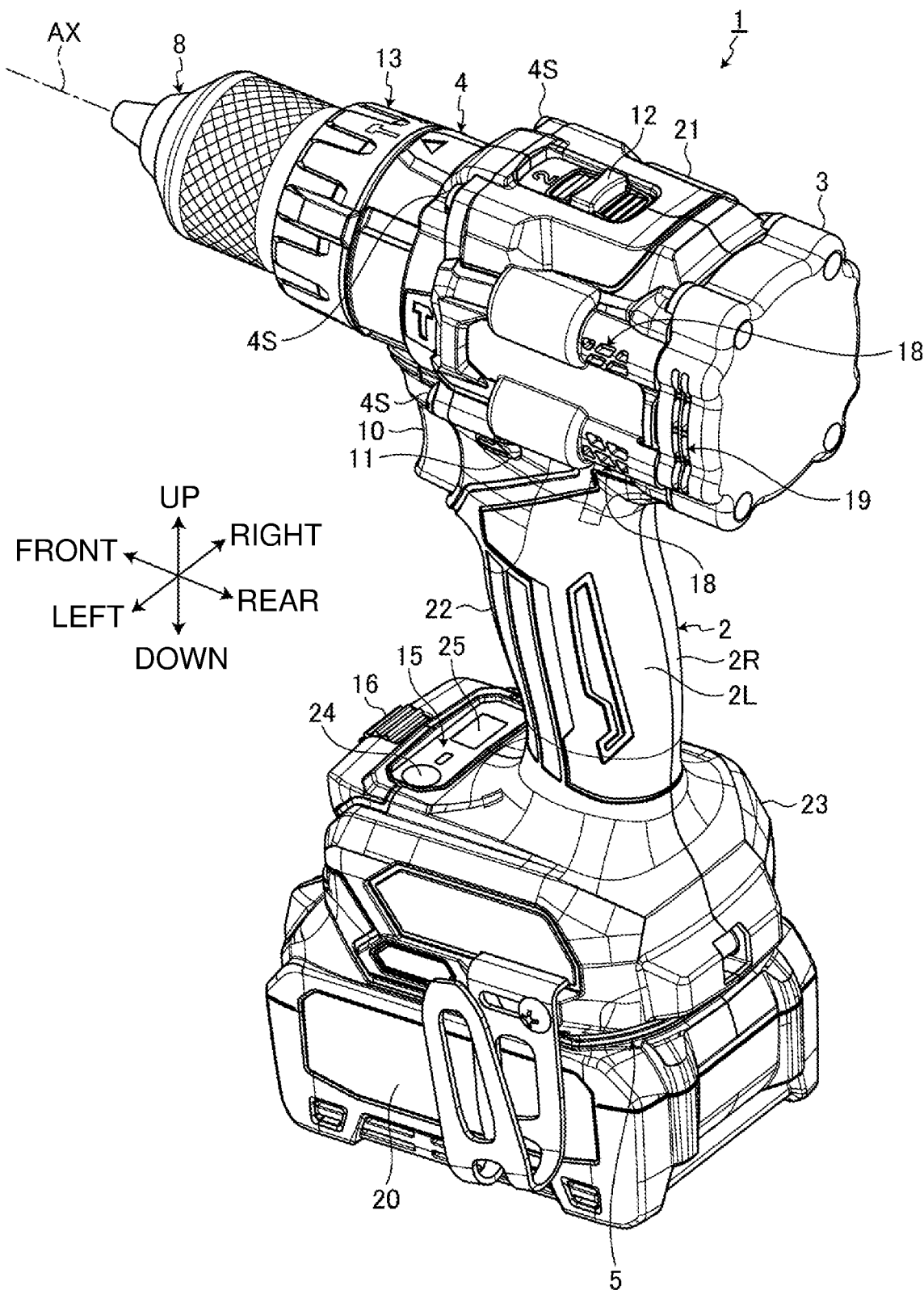
FIG. 2 is a rear perspective view of the driver drill according to the embodiment.
Figure 3:
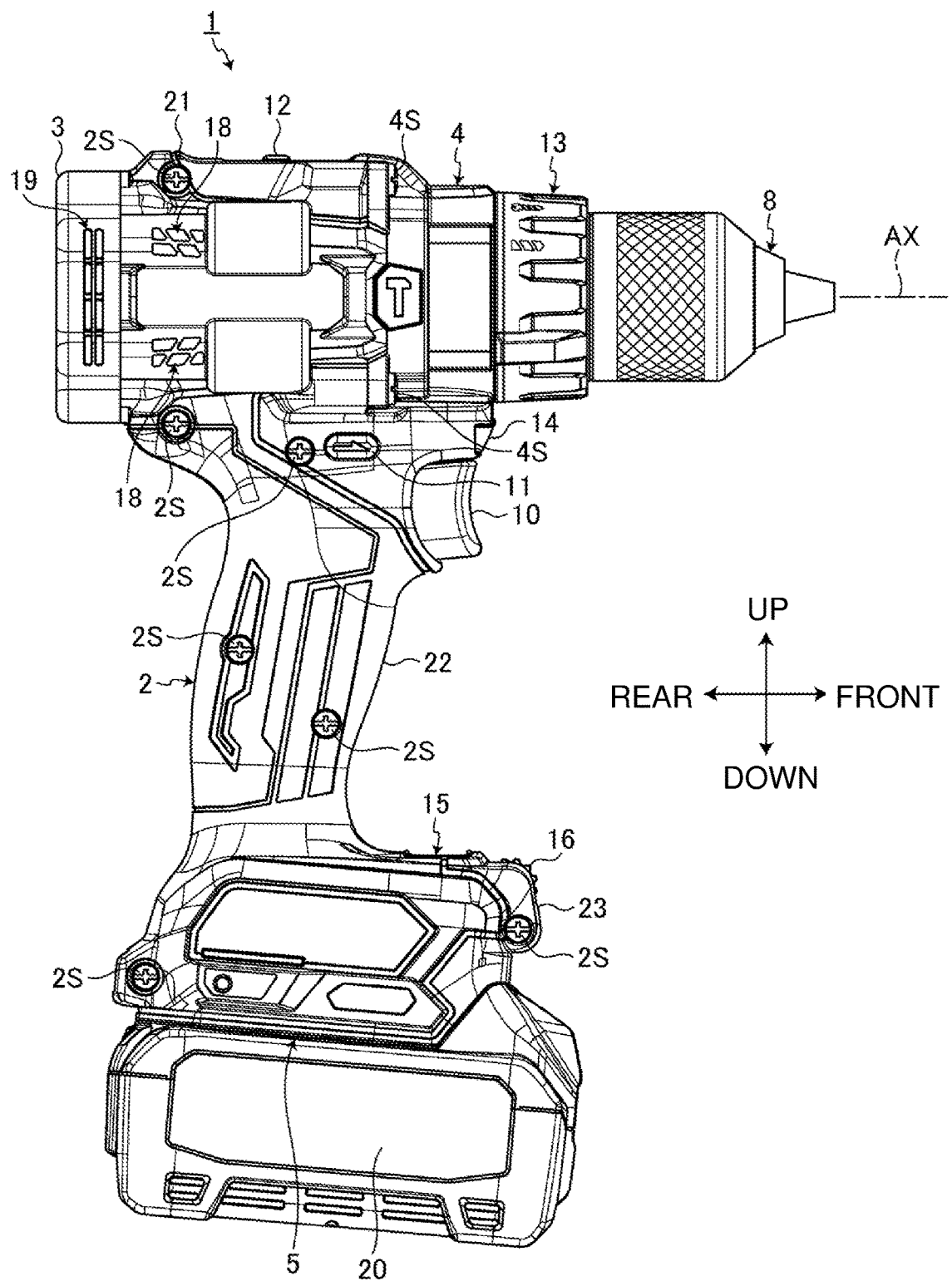
FIG. 3 is a side view of the driver drill according to the embodiment.
Figure 4:
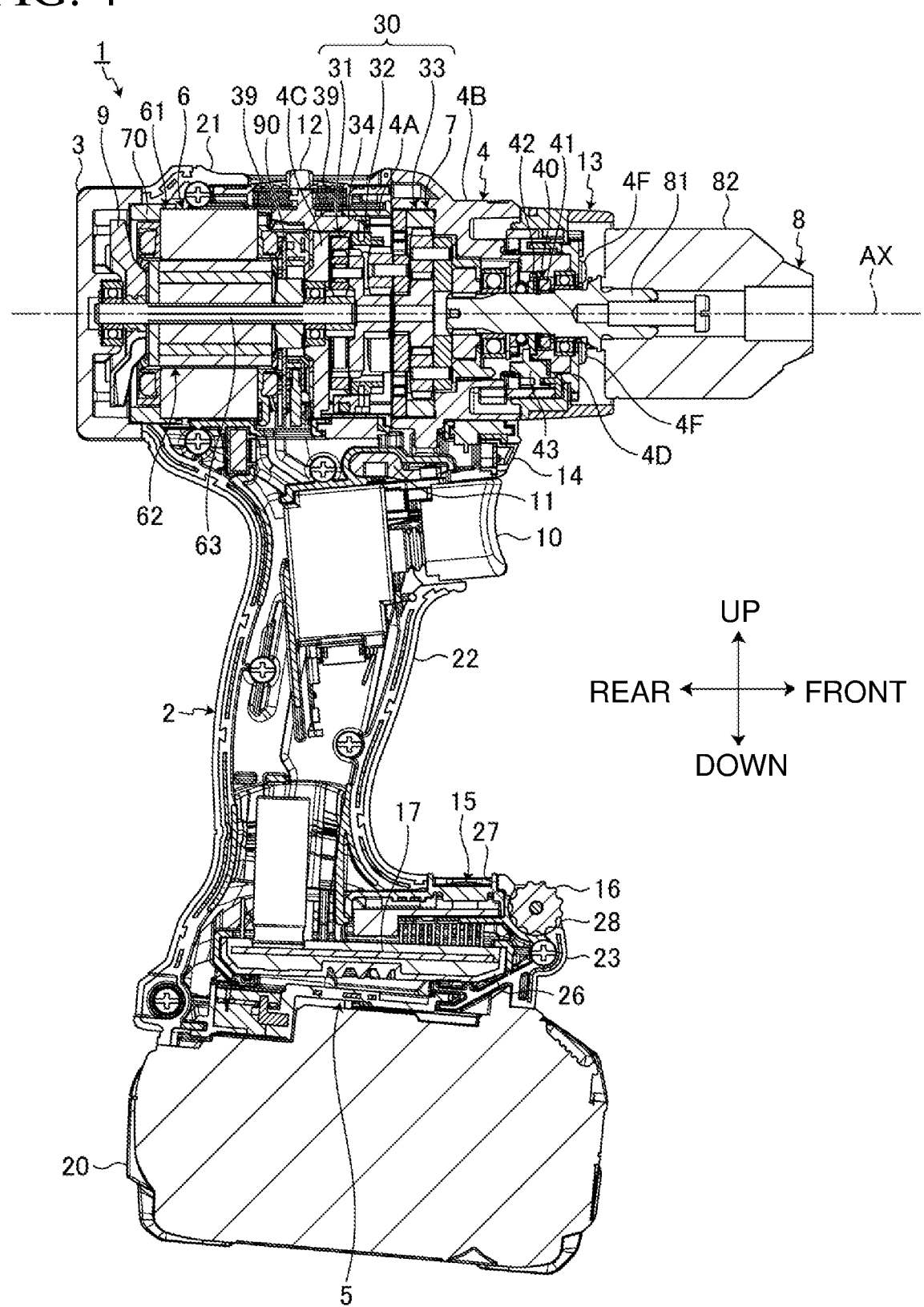
FIG. 4 is a sectional view of the driver drill according to the embodiment.
Figure 5:
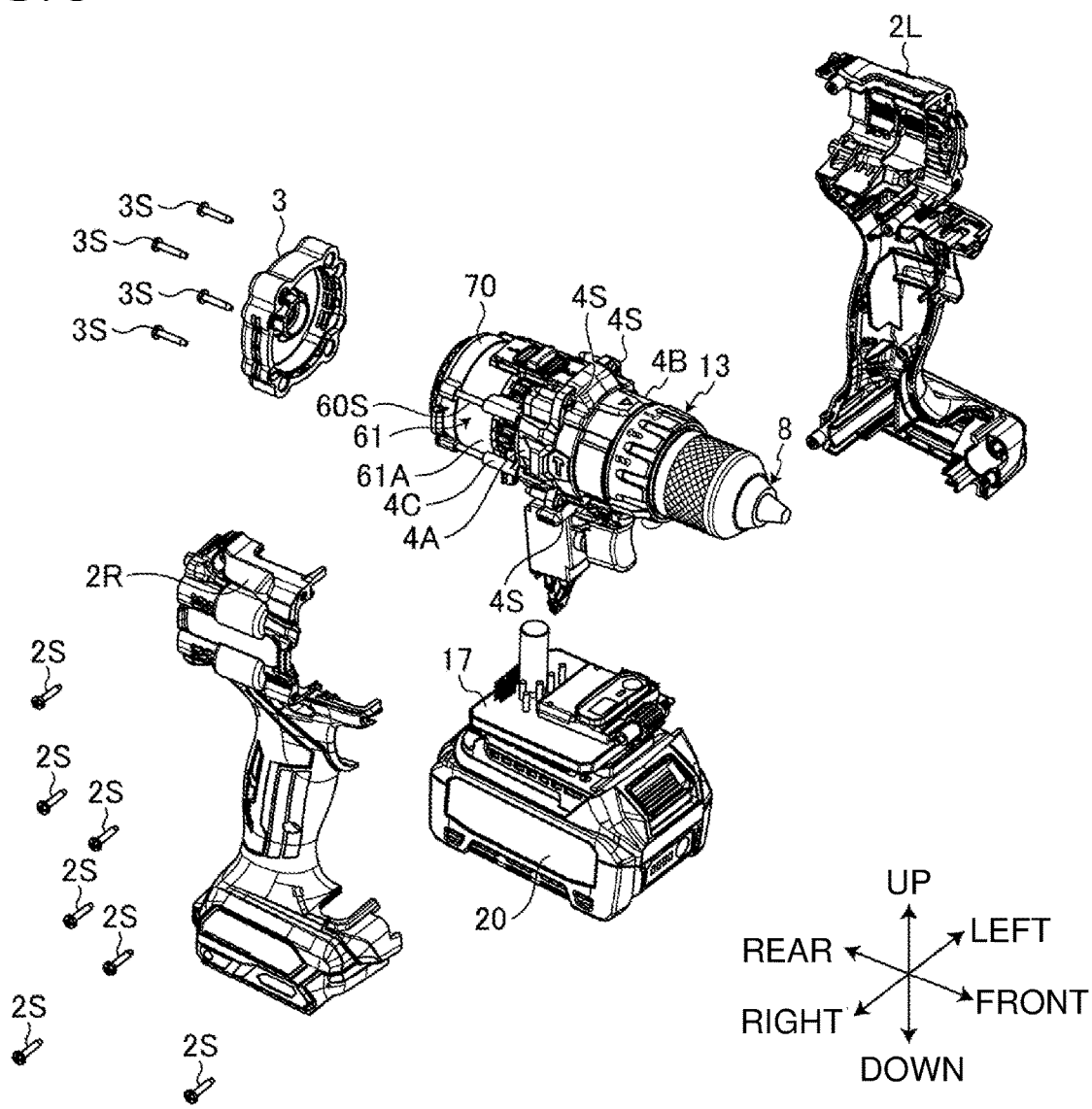
FIG. 5 is a front exploded perspective view of the driver drill according to the embodiment.
Figure 6:
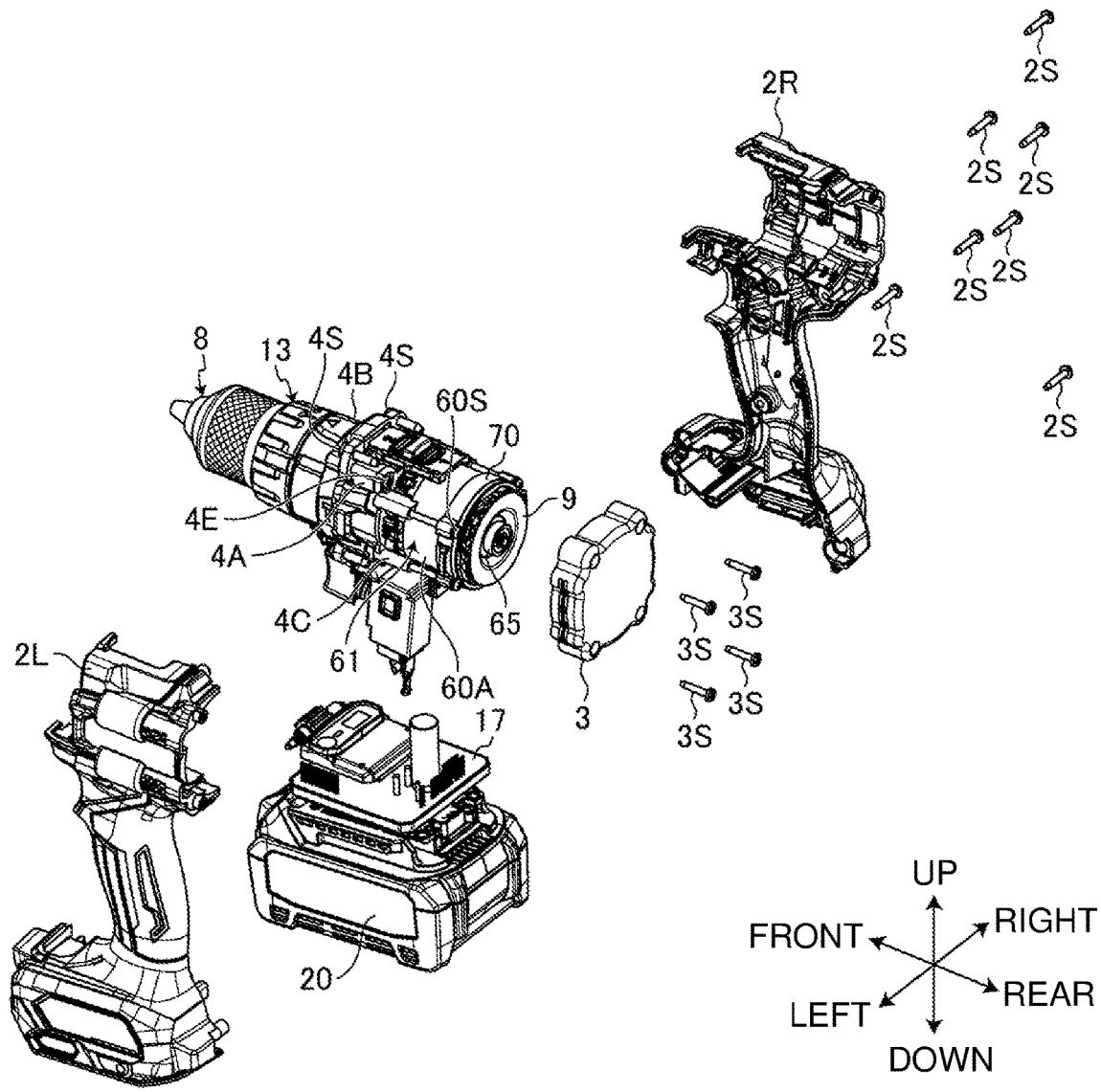
FIG. 6 is a rear exploded perspective view of the driver drill according to the embodiment.

FIG. 1 is a front perspective view of a driver drill 1 according to an embodiment. FIG. 2 is a rear perspective view of the driver drill 1. FIG. 3 is a side view of the driver drill 1. FIG. 4 is a sectional view of the driver drill 1. FIG. 5 is a front exploded perspective view of the driver drill 1. FIG. 6 is a rear exploded perspective view of the driver drill 1. The driver drill 1 according to the embodiment is a vibration driver drill.

As shown in FIGS. 1 to 6, the driver drill 1 includes a housing 2, a rear cover 3, a casing 4, a battery mount 5, a motor 6, a power transmission 7, an output unit 8, a fan 9, a trigger lever 10, a forward-reverse switch lever 11, a speed switch lever 12, a mode switch ring 13, a light 14, an interface panel 15, a dial 16, a controller board 17, and a rotation sensor board 90.

The housing 2 is formed from a synthetic resin. The housing 2 in the embodiment is formed from nylon. The housing 2 includes a left housing 2L and a right housing 2R. The left housing 2L and the right housing 2R are fastened together with screws 2S, thus forming the housing 2.

The housing 2 includes a motor compartment 21, a grip 22, and a battery holder 23.

The motor compartment 21 accommodates the motor 6. The motor compartment 21 is cylindrical.

The grip 22 is grippable by an operator. The grip 22 is located below the motor compartment 21. The grip 22 extends downward from the motor compartment 21. The trigger lever 10 is located in a front portion of the grip 22.

The battery holder 23 accommodates the controller board 17. The battery holder 23 is located under the grip 22. The battery holder 23 is connected to the lower end of the grip 22. The battery holder 23 has larger outer dimensions than the grip 22 in the front-rear and lateral directions.

The rear cover 3 is formed from a synthetic resin. The rear cover 3 in the embodiment is formed from nylon. The rear cover 3 is located behind the motor compartment 21. The rear cover 3 accommodates the fan 9. The rear cover 3 covers a rear opening of the motor compartment 21. The rear cover 3 is fastened to the motor compartment 21 with four screws 3S.

The motor compartment 21 has inlets 18. The rear cover 3 has outlets 19. Air outside the housing 2 flows into an internal space of the housing 2 through the inlets 18. Air in the internal space of the housing 2 flows out of the housing 2 through the outlets 19.

The casing 4 accommodates the power transmission 7. The casing 4 includes a first casing 4A, a second casing 4B, a bracket 4C, and a stop plate 4D. The second casing 4B is located in front of the first casing 4A. The mode switch ring 13 is located in front of the second casing 4B. The first casing 4A is formed from a synthetic resin. The second casing 4B is formed from a metal. The second casing 4B in the embodiment is formed from aluminum. The casing 4 is located in front of the motor compartment 21. The first casing 4A and the second casing 4B are cylindrical.

The first casing 4A is fixed to the rear end of the second casing 4B. The bracket 4C covers an opening at the rear end of the first casing 4A. The bracket 4C is fastened to the rear end of the first casing 4A with screws 4E. The stop plate 4D covers an opening at the front end of the second casing 4B. The stop plate 4D is fastened to the front end of the second casing 4B with screws 4F.

The casing 4 covers a front opening of the motor compartment 21. The first casing 4A is located inside the motor compartment 21. The second casing 4B is fastened to the motor compartment 21 with four screws 4S.

The battery mount 5 is located under the battery holder 23. The battery mount 5 is connected to a battery pack 20. The battery pack 20 is attached to the battery mount 5 in a detachable manner. The battery pack 20 includes a secondary battery. The battery pack 20 in the embodiment includes a rechargeable lithium-ion battery. The battery pack 20 is attached to the battery mount 5 to power the driver drill 1. The motor 6 is driven by power supplied from the battery pack 20. The interface panel 15 and the controller board 17 operate on power supplied from the battery pack 20.

The motor 6 powers the driver drill 1. The motor 6 is a brushless inner-rotor motor. The motor 6 is accommodated in the motor compartment 21. The motor 6 includes a cylindrical stator 61 and a rotor 62 located inward from the stator 61. The rotor 62 rotates relative to the stator 61. The rotor 62 includes a rotor shaft 63 extending in the axial direction (front-rear direction).

The power transmission 7 is located in front of the motor 6. The power transmission 7 is accommodated in the casing 4. The power transmission 7 connects the rotor shaft 63 and the output unit 8 together. The power transmission 7 transmits power generated by the motor 6 to the output unit 8. The power transmission 7 includes multiple gears.

The power transmission 7 includes a reducer 30 and a vibrator 40.

The reducer 30 reduces rotation of the rotor shaft 63 and rotates the output unit 8 at a lower rotational speed than the rotor shaft 63. The reducer 30 in the embodiment includes a first planetary gear assembly 31, a second planetary gear assembly 32, and a third planetary gear assembly 33. The first planetary gear assembly 31 is at least partially located frontward from the motor 6. The second planetary gear assembly 32 is located frontward from the first planetary gear assembly 31. The third planetary gear assembly 33 is located frontward from the second planetary gear assembly 32. The first planetary gear assembly 31 is rotatable with a rotational force from the motor 6. The second planetary gear assembly 32 is rotatable with a rotational force from the first planetary gear assembly 31. The third planetary gear assembly 33 is rotatable with a rotational force from the second planetary gear assembly 32.

The vibrator 40 vibrates the output unit 8 in the axial direction. The vibrator 40 includes a first cam 41, a second cam 42, and a vibration switch ring 43.

The output unit 8 is located frontward from the motor 6. The output unit 8 rotates with a rotational force from the motor 6. The output unit 8 holding a tip tool rotates with a rotational force transmitted from the motor 6 through the power transmission 7. The output unit 8 includes a spindle 81 and a chuck 82. The spindle 81 rotates about the rotation axis AX with a rotational force transmitted from the motor 6. The chuck 82 receives the tip tool. The spindle 81 is at least partially located frontward from the third planetary gear assembly 33. The spindle 81 is connected to the third planetary gear assembly 33. The spindle 81 rotates with a rotational force transmitted from the motor 6 through the first planetary gear assembly 31, the second planetary gear assembly 32, and the third planetary gear assembly 33. A tip tool such as a screwdriver bit or a drill bit is detachably attached to the chuck 82.

The fan 9 is located behind a rotor core 62A (described later). The fan 9 generates an airflow for cooling the motor 6. The fan 9 is fixed to at least a part of the rotor 62. The fan 9 is fixed to a rear portion of the rotor shaft 63. The fan 9 rotates together with the rotor shaft 63 as the rotor shaft 63 rotates. Air outside the housing 2 thus flows into the internal space of the housing 2 through the inlets 18 and flows through the internal space of the housing 2 to cool the motor 6. The air passing through the internal space of the housing 2 flows out of the housing 2 through the outlets 19.

The trigger lever 10 activates the motor 6. The trigger lever 10 is located on an upper front of the grip 22. The trigger lever 10 has a front end protruding frontward from the front of the grip 22. The trigger lever 10 is movable in the front-rear direction. The trigger lever 10 is operable by the operator. The trigger lever 10 moves backward to activate the motor 6. When the trigger lever 10 is released from being operated, the motor 6 is stopped.

The forward-reverse switch lever 11 is operable to switch the rotation direction of the motor 6. The forward-reverse switch lever 11 is located in an upper portion of the grip 22. The forward-reverse switch lever 11 has a left end protruding leftward from a left portion of the grip 22. The forward-reverse switch lever 11 has a right end protruding rightward from a right portion of the grip 22. The forward-reverse switch lever 11 is movable in the lateral direction. The forward-reverse switch lever 11 is operable by the operator. The forward-reverse switch lever 11 moves leftward to rotate the motor 6 forward. The forward-reverse switch lever 11 moves rightward to rotate the motor 6 reversely. Switching the rotation direction of the motor 6 switches the rotation direction of the spindle 81.

The speed switch lever 12 is operable to change the speed mode of the reducer 30. The speed switch lever 12 is located in an upper portion of the motor compartment 21. The speed switch lever 12 is movable relative to the motor compartment 21 in the front-rear direction. The speed switch lever 12 is operable by the operator. The speed mode of the reducer 30 includes a high-speed mode and a low-speed mode. The high-speed mode refers to a speed mode in which the output unit 8 rotates at a high speed. The low-speed mode refers to a speed mode in which the output unit 8 rotates at a low speed. The movable range of the speed switch lever 12 is defined in the front-rear direction. The speed switch lever 12 moves to a high-speed mode position at the rear of the movable range to set the reducer 30 to the high-speed mode. The speed switch lever 12 moves to a low-speed mode position at the front of the movable range to set the reducer 30 to the low-speed mode.

The mode switch ring 13 is operable to change the operation mode of the vibrator 40. The mode switch ring 13 is located in front of the casing 4. The mode switch ring 13 is rotatable. The mode switch ring 13 is operable by the operator. The operation mode of the vibrator 40 includes a vibration mode and a non-vibration mode. The vibration mode refers to an operation mode in which the output unit 8 vibrates in the axial direction. The non-vibration mode refers to an operation mode in which the output unit 8 does not vibrate in the axial direction. The mode switch ring 13 at a vibration mode position in the rotation direction sets the vibrator 40 to the vibration mode. The mode switch ring 13 at a non-vibration mode position in the rotation direction sets the vibrator 40 to the non-vibration mode. The non-vibration mode includes a driver mode (screw tightening mode) and a drill mode.

The light 14 emits illumination light to illuminate ahead of the driver drill 1. The light 14 includes, for example, light-emitting diodes (LEDs). The light 14 is located under a front portion of the motor compartment 21. The light 14 is located above the trigger lever 10.

The interface panel 15 is located on an upper surface of the battery holder 23. The interface panel 15 includes an operation unit 24 and a display 25. The interface panel 15 is a plate. The operation unit 24 includes an operation button. The display 25 is, for example, a segment display including multiple segment light emitters, a flat display panel such as a liquid crystal display, or an indicator display including multiple LEDs.

The battery holder 23 has a panel opening 27. The panel opening 27 is located in an upper surface of the battery holder 23 and frontward from the grip 22. The interface panel 15 is at least partially received in the panel opening 27.

The operation unit 24 is operable to change the drive mode of the motor 6. The operation unit 24 is operable by the operator. The motor 6 has a drill mode and a clutch mode as its drive mode. The drill mode refers to a drive mode in which the motor 6 is driven independently of torque applied to the motor 6. The clutch mode refers to a drive mode in which the motor 6 is stopped in response to the value of torque applied to the motor 6 exceeding a torque threshold.

The dial 16 is operable to change the drive conditions of the motor 6. The dial 16 is located in a front portion of the battery holder 23. The dial 16 is supported by the battery holder 23 in a rotatable manner. The dial 16 is rotatable by 360 degrees or greater. The dial 16 is operable by the operator. The drive conditions of the motor 6 include the torque threshold. The dial 16 is operable to change the torque threshold in the clutch mode set by the operation unit 24.

The battery holder 23 has a dial opening 28. The dial opening 28 is located in a front right portion of the battery holder 23. The dial 16 is at least partially received in the dial opening 28.

The controller board 17 outputs a control command for controlling the motor 6. The controller board 17 is at least partially accommodated in a controller case 26. The controller board 17 is held by the controller case 26 and is accommodated in the battery holder 23. The controller board 17 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a transistor, a capacitor, and a resistor.

The controller board 17 sets the drive conditions of the motor 6 based on an operation on the dial 16. The drive conditions of the motor 6 include the torque threshold. In the clutch mode, the controller board 17 sets a torque threshold based on the operation on the dial 16.

In the clutch mode, the controller board 17 stops the motor 6 in response to the value of torque applied to the motor 6 exceeding the set torque threshold.

The controller board 17 displays the set drive conditions of the motor 6 on the display 25. The controller board 17 causes the display 25 to display the set torque threshold.

The rotation sensor board 90 includes a circuit board on which multiple rotation sensors to detect rotation of the rotor 62 are mounted. The controller board 17 supplies a driving current to the motor 6 in response to the detection data from the rotation sensors.

Motor and Power Transmission

Figure 7:
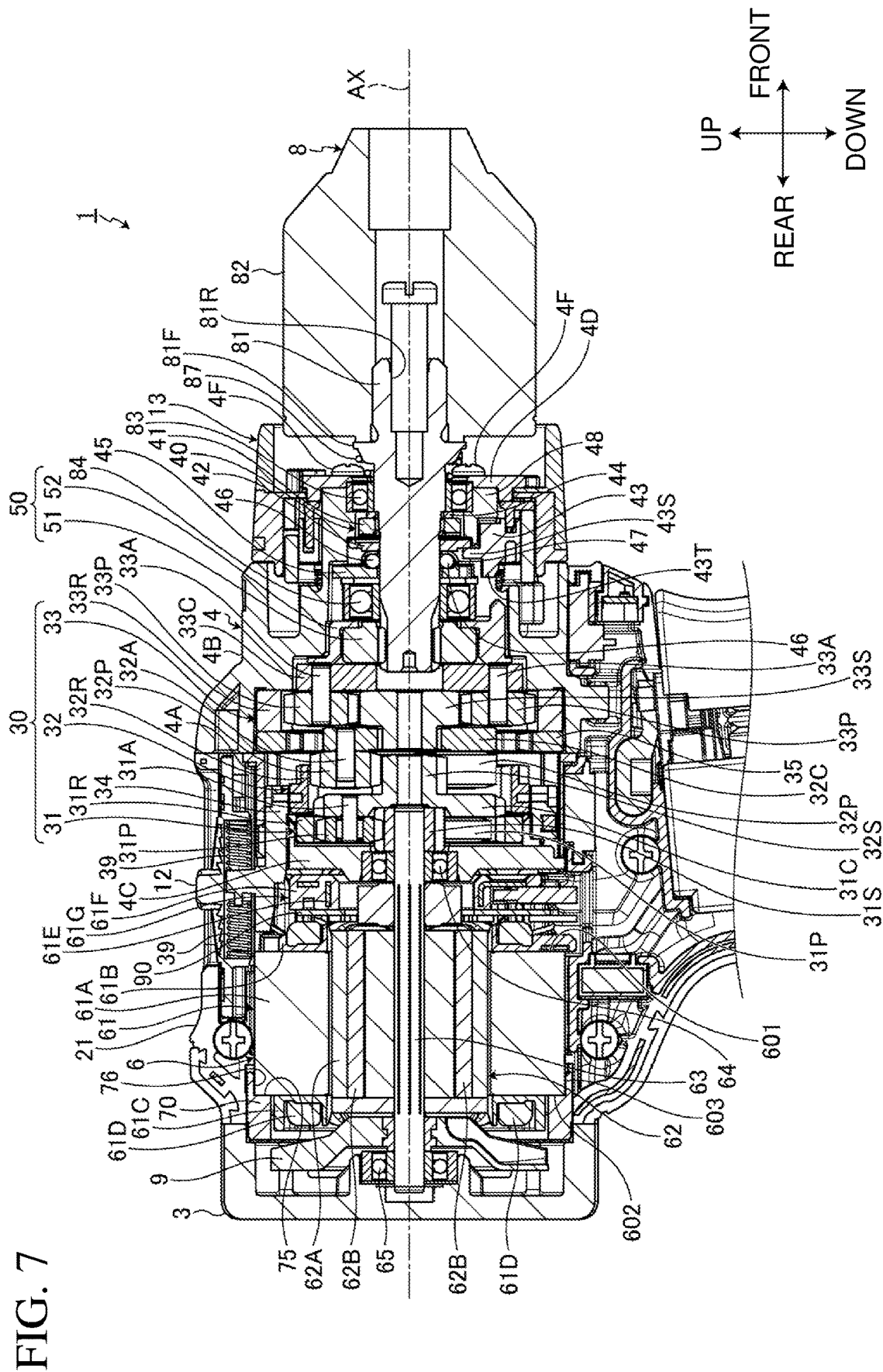
FIG. 7 is a partial sectional view of the driver drill according to the embodiment.

FIG. 7 is a partial sectional view of the driver drill 1 according to the embodiment. As shown in FIG. 7, the motor 6 includes the cylindrical stator 61 and the rotor 62 located inward from the stator 61. The rotor 62 includes the rotor shaft 63 extending in the axial direction.

The stator 61 includes a stator core 61A, a front insulator 61B, a rear insulator 61C, multiple coils 61D, and a busbar unit 61G. The stator core 61A includes multiple steel plates stacked on one another. The front insulator 61B is located in front of the stator core 61A. The rear insulator 61C is located behind the stator core 61A. The coils 61D are wound around the stator core 61A with the front insulator 61B and the rear insulator 61C in between. The busbar unit 61G is fixed to the front insulator 61B. The busbar unit 61G includes short-circuiting members 61E and a resin member 61F. The resin member 61F covers at least a part of the short-circuiting members 61E.

The rotor 62 rotates about the rotation axis AX. The rotor 62 includes the rotor shaft 63, the rotor core 62A, and multiple permanent magnets 62B. The rotor core 62A surrounds the rotor shaft 63. The multiple permanent magnets 62B are held by the rotor core 62A. The rotor core 62A is cylindrical. The rotor core 62A includes multiple steel plates stacked on one another. The rotor core 62A has multiple through-holes extending in the axial direction. The rotor core 62A has the through-holes located circumferentially. The permanent magnets 62B are placed in the respective through-holes in the rotor core 62A.

The rotation sensor board 90 includes the circuit board on which the multiple rotation sensors are mounted to detect rotation of the rotor 62. The rotation sensor board 90 is attached to the front insulator 61B. The rotation sensors mounted on the rotation sensor board 90 include magnetic sensors that detect the magnetic fields of the permanent magnets 62B. The magnetic sensors are, for example, Hall sensors including Hall devices. The rotation sensors detect the rotation of the rotor 62 by detecting the magnetic fields of the permanent magnets 62B. The controller board 17 supplies a driving current to the coils 61D in response to the detection data from the rotation sensors.

The rotor shaft 63 rotates about the rotation axis AX. The rotation axis AX of the rotor shaft 63 is aligned with the rotation axis of the output unit 8. The rotor shaft 63 includes a front portion supported by a bearing 64 in a rotatable manner. The rotor shaft 63 includes a rear portion supported by a bearing 65 in a rotatable manner. The bearing 64 is held by the bracket 4C located in front of the stator 61. The bearing 65 is held by the rear cover 3. The rotor shaft 63 has its front end located frontward from the bearing 64. The rotor shaft 63 has its front end located in an internal space of the casing 4.

A pinion gear 31S is located at the front end of the rotor shaft 63. The pinion gear 31S serves as a sun gear in the first planetary gear assembly 31. The pinion gear 31S is rotated by the motor 6. The rotor shaft 63 is connected to the first planetary gear assembly 31 in the reducer 30 with the pinion gear 31S.

The first planetary gear assembly 31 includes multiple planetary gears 31P, a first carrier 31C, and an internal gear 31R. The planetary gears 31P surround the pinion gear 31S. The first carrier 31C supports the planetary gears 31P. The internal gear 31R surrounds the planetary gears 31P. The first carrier 31C supports the planetary gears 31P with the corresponding pins 31A in a rotatable manner. The first carrier 31C includes a gear on its outer periphery.

The second planetary gear assembly 32 includes a sun gear 32S, multiple planetary gears 32P, a second carrier 32C, and an internal gear 32R. The planetary gears 32P surround the sun gear 32S. The second carrier 32C supports the planetary gears 32P. The internal gear 32R surrounds the planetary gears 32P. The second carrier 32C supports the planetary gears 32P with the corresponding pins 32A in a rotatable manner. The sun gear 32S is located in front of the first carrier 31C. The sun gear 32S has a smaller diameter than the first carrier 31C. The first carrier 31C is integral with the sun gear 32S. The first carrier 31C and the sun gear 32S rotate together.

The third planetary gear assembly 33 includes a sun gear 33S, multiple planetary gears 33P, a third carrier 33C, and an internal gear 33R. The planetary gears 33P surround the sun gear 33S. The third carrier 33C supports the planetary gears 33P. The internal gear 33R surrounds the planetary gears 33P. The third carrier 33C supports the planetary gears 33P with the corresponding pins 33A in a rotatable manner. The sun gear 33S is located in front of the second carrier 32C.

The reducer 30 includes a speed switch ring 34 and a connection ring 35. The speed switch ring 34 is connected to the speed switch lever 12. The connection ring 35 is located in front of the speed switch ring 34. The connection ring 35 is fixed to an inner surface of the first casing 4A. The connection ring 35 includes a gear on its inner periphery. Coil springs 39 are located in front of and behind an upper portion of the speed switch ring 34. The speed switch ring 34 is connected to the speed switch lever 12 with the coil springs 39 in between.

The speed switch ring 34 switches between a low-speed mode and a high-speed mode. The speed switch ring 34 is connected to the internal gear 32R. The speed switch lever 12 is connected to the internal gear 32R with the speed switch ring 34. The speed switch lever 12 is movable together with the speed switch ring 34 and the internal gear 32R. The operator operates the speed switch lever 12 to move the speed switch ring 34 in the front-rear direction in the first casing 4A. The speed switch ring 34 moves between the low-speed mode position and the high-speed mode position in the front-rear direction with the internal gear 32R meshing with the planetary gears 32P. This causes switching between the low-speed mode and the high-speed mode. The high-speed mode position is rearward from the low-speed mode position. The speed switch lever 12 is operable to switch between the low-speed mode and the high-speed mode.

The internal gear 32R at the low-speed mode position is in contact with the connection ring 35. This restricts rotation of the internal gear 32R. The internal gear 32R at the high-speed mode position is apart from the connection ring 35. This allows the rotation of the internal gear 32R.

The internal gear 32R at the low-speed mode position meshes with the planetary gears 32P. The internal gear 32R at the high-speed mode position meshes with both the planetary gears 32P and the first carrier 31C.

When the rotor shaft 63 rotates as driven by the motor 6 with the internal gear 32R at the low-speed mode position, the pinion gear 31S rotates, and the planetary gears 31P revolve about the pinion gear 31S. The first carrier 31C and the sun gear 32S then rotate at a lower rotational speed than the rotor shaft 63. The planetary gears 32P then revolve about the sun gear 32S. The second carrier 32C and the sun gear 33S then rotate at a lower rotational speed than the first carrier 31C. When the motor 6 is driven with the internal gear 32R at the low-speed mode position, both the first planetary gear assembly 31 and the second planetary gear assembly 32 operate for rotation reduction, causing the second carrier 32C and the sun gear 33S to rotate in the low-speed mode.

When the rotor shaft 63 rotates as driven by the motor 6 with the internal gear 32R at the high-speed mode position, the pinion gear 31S rotates, and the planetary gears 31P revolve about the pinion gear 31S. The first carrier 31C and the sun gear 32S then rotate at a lower rotational speed than the rotor shaft 63. The internal gear 32R at the high-speed mode position meshes with both the planetary gears 32P and the first carrier 31C. Thus, the internal gear 32R rotates together with the first carrier 31C. As the internal gear 32R rotates, the planetary gears 32P revolve at the same revolution speed as the internal gear 32R. The second carrier 32C and the sun gear 33S then rotate at the same rotational speed as the first carrier 31C. When the motor 6 is driven with the internal gear 32R at the high-speed mode position, the first planetary gear assembly 31 operates for rotation reduction without the second planetary gear assembly 32 operating for rotation reduction, thus causing the second carrier 32C and the sun gear 33S to rotate in the high-speed mode.

As the second carrier 32C and the sun gear 33S rotate, the planetary gears 33P revolve about the sun gear 33S. This causes the third carrier 33C to rotate.

The spindle 81 is connected to the third carrier 33C with a spindle locking assembly 50. The spindle locking assembly 50 includes a lock cam 51 and a lock ring 52. The lock cam 51 surrounds the spindle 81. The lock ring 52 supports the lock cam 51 in a rotatable manner. The lock ring 52 is located inside the second casing 4B. The lock ring 52 is fixed to the second casing 4B. As the third carrier 33C rotates, the spindle 81 rotates.

The spindle 81 is supported by a bearing 83 and a bearing 84 in a rotatable manner. In this state, the spindle 81 is movable in the front-rear direction.

The spindle 81 includes a flange 81F. A coil spring 87 is located between the flange 81F and the bearing 83. The flange 81F is in contact with a front end of the coil spring 87. The coil spring 87 generates an elastic force for moving the spindle 81 forward.

The chuck 82 can hold the tip tool. The chuck 82 is connected to a front portion of the spindle 81. The spindle 81 has a threaded hole 81R on its front end. The chuck 82 rotates as the spindle 81 rotates. The chuck 82 holding the tip tool rotates.

The first cam 41 and the second cam 42 in the vibrator 40 are both located inside the second casing 4B. The first cam 41 and the second cam 42 are located between the bearing 83 and the bearing 84 in the front-rear direction.

The first cam 41 is annular. The first cam 41 surrounds the spindle 81. The first cam 41 is fixed to the spindle 81. The first cam 41 rotates together with the spindle 81. The first cam 41 includes cam teeth on its rear surface. The first cam 41 is supported by a stop ring 44. The stop ring 44 surrounds the spindle 81. The stop ring 44 is located between the first cam 41 and the bearing 83 in the front-rear direction.

The second cam 42 is annular. The second cam 42 is located behind the first cam 41. The second cam 42 surrounds the spindle 81. The second cam 42 is rotatable relative to the spindle 81. The second cam 42 includes cam teeth on its front surface. The cam teeth on the front surface of the second cam 42 mesh with the cam teeth on the rear surface of the first cam 41. The second cam 42 includes a tab on its rear surface.

A support ring 45 is located between the second cam 42 and the bearing 84 in the front-rear direction. The support ring 45 is located inside the second casing 4B. The support ring 45 is fixed to the second casing 4B. The support ring 45 includes multiple steel balls 46 on its front surface. A washer 47 is located between the steel ball 46 and the second cam 42. The second cam 42 is rotatable while being restricted from moving forward and backward in a space defined by the support ring 45 and the washer 47.

The vibration switch ring 43 switches between the vibration mode and the non-vibration mode. The mode switch ring 13 is connected to the vibration switch ring 43 with a cam ring 48 in between. The mode switch ring 13 is rotatable together with the cam ring 48. The vibration switch ring 43 is movable in the front-rear direction. The vibration switch ring 43 includes a protrusion 43T. The protrusion 43T is placed in a guide hole in the second casing 4B. The vibration switch ring 43 is movable in the front-rear direction while being guided along the guide hole in the second casing 4B. The protrusion 43T restricts the vibration switch ring 43 from rotating. The operator operates the mode switch ring 13 to move the vibration switch ring 43 in the front-rear direction. The vibration switch ring 43 moves in the front-rear direction between an advanced position and a retracted position rearward from the advanced position to switch between the vibration mode and the non-vibration mode. The retracted position is rearward from the advanced position. The mode switch ring 13 is operable to switch between the vibration mode and the non-vibration mode.

The vibration mode includes the state of the second cam 42 being restricted from rotating. The non-vibration mode includes the state of the second cam 42 being rotatable. When the vibration switch ring 43 moves to the advanced position, the second cam 42 is restricted from rotating. When the vibration switch ring 43 moves to the retracted position, the second cam 42 becomes rotatable.

In the vibration mode, the vibration switch ring 43 at the advanced position is at least partially in contact with the second cam 42. This restricts the second cam 42 from rotating. When the motor 6 is driven in this state, the first cam 41 fixed to the spindle 81 rotates in contact with the cam teeth on the second cam 42. The spindle 81 thus rotates while vibrating in the front-rear direction.

In the non-vibration mode, the vibration switch ring 43 at the retracted position is separate from the second cam 42. This allows the second cam 42 to rotate. When the motor 6 is driven in this state, the second cam 42 rotates together with the first cam 41 and the spindle 81. The spindle 81 thus rotates without vibrating in the front-rear direction.

The vibration switch ring 43 surrounds the first cam 41 and the second cam 42. The vibration switch ring 43 includes an opposing portion 43S facing the rear surface of the second cam 42. The opposing portion 43S protrudes radially inward from a rear portion of the vibration switch ring 43.

When the mode switch ring 13 is operated to move the vibration switch ring 43 to the advanced position, the tab on the rear surface of the second cam 42 is in contact with the opposing portion 43S of the vibration switch ring 43. This restricts the second cam 42 from rotating. In this manner, the mode switch ring 13 is operated to move the vibration switch ring 43 to the advanced position and to switch the vibrator 40 to the vibration mode.

When the mode switch ring 13 is operated to move the vibration switch ring 43 to the retracted position, the opposing portion 43S of the vibration switch ring 43 is separate from the second cam 42. This allows the second cam 42 to rotate. In this manner, the mode switch ring 13 is operated to move the vibration switch ring 43 to the retracted position and to switch the vibrator 40 to the non-vibration mode.

Noise Reduction System

Figure 8:
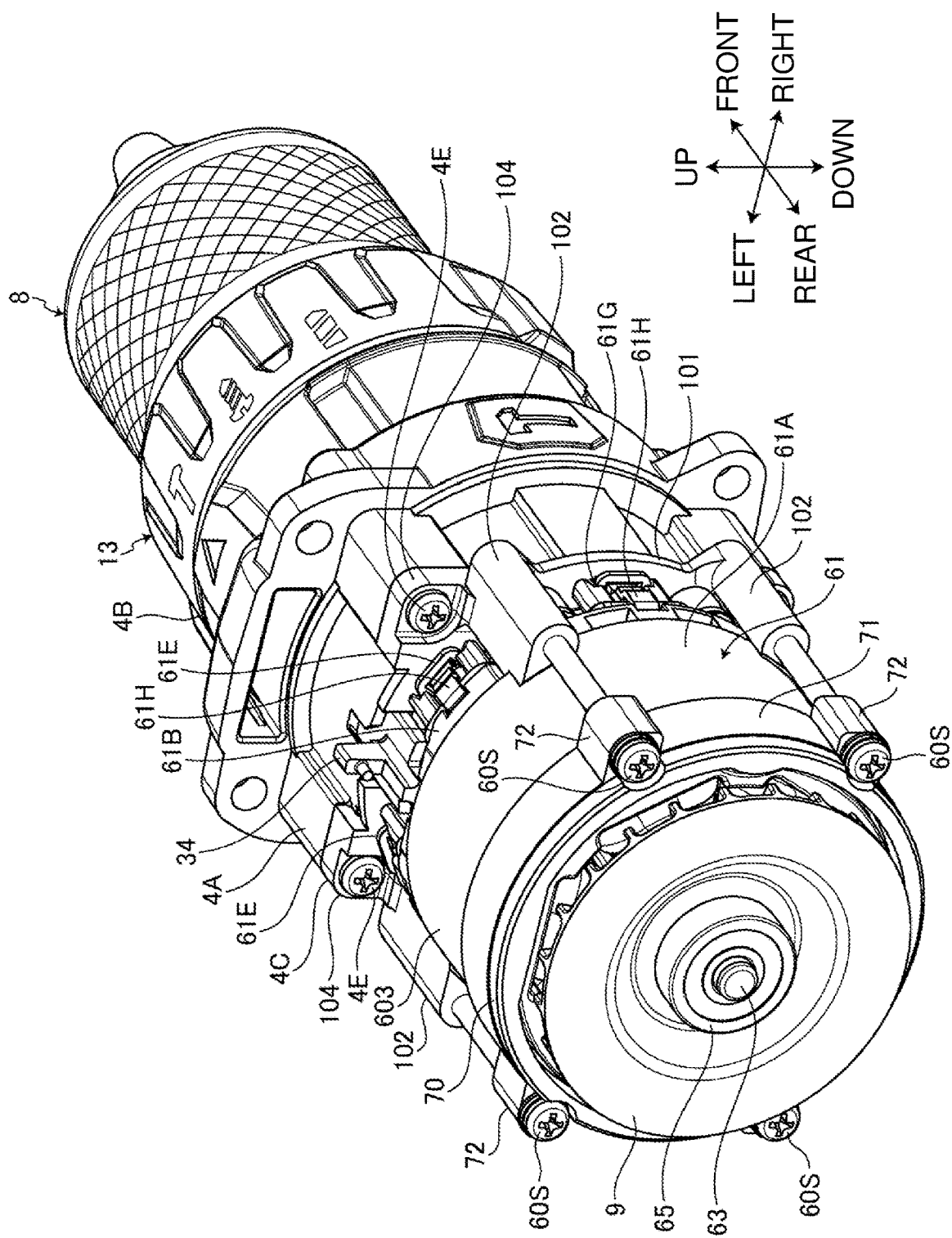
FIG. 8 is a partial perspective view of the driver drill according to the embodiment as viewed from the right rear.
Figure 9:
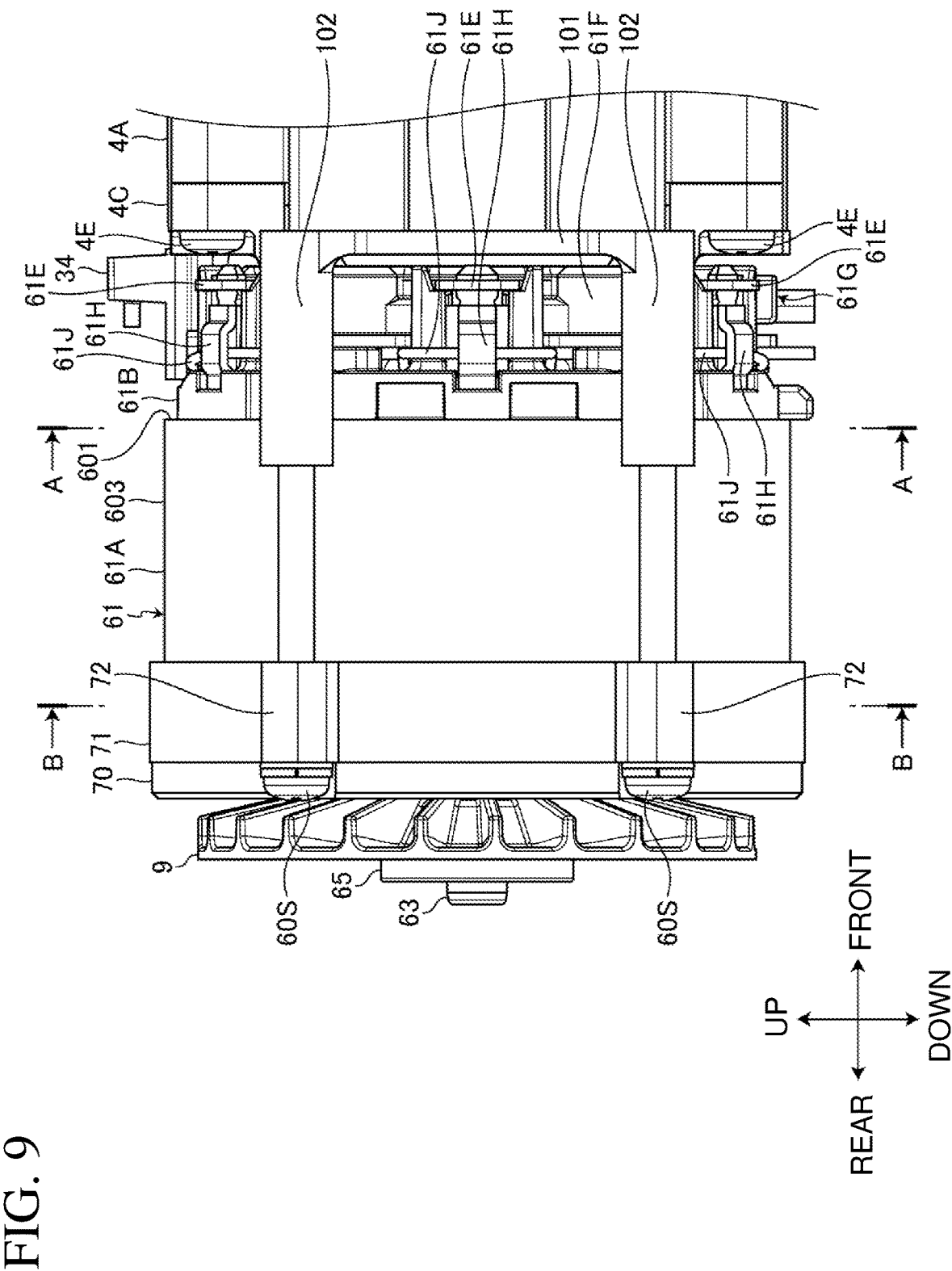
FIG. 9 is a partial left side view of the driver drill according to the embodiment.
Figure 10:
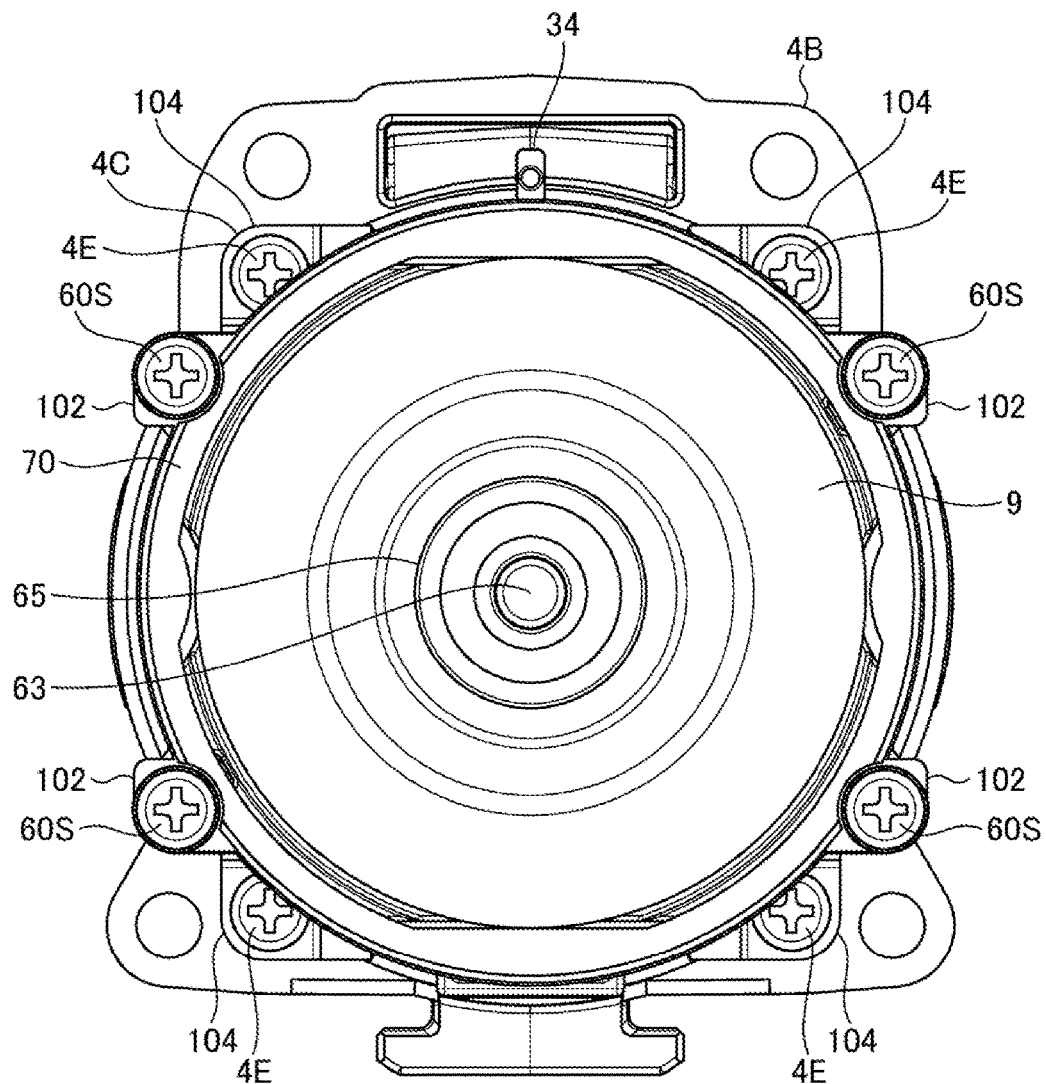
FIG. 10 is a partial rear view of the driver drill according to the embodiment.
Figure 10:
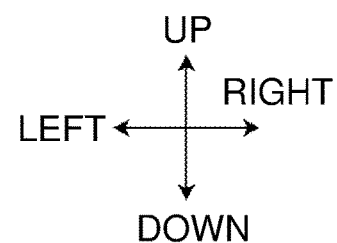
Figure 11:
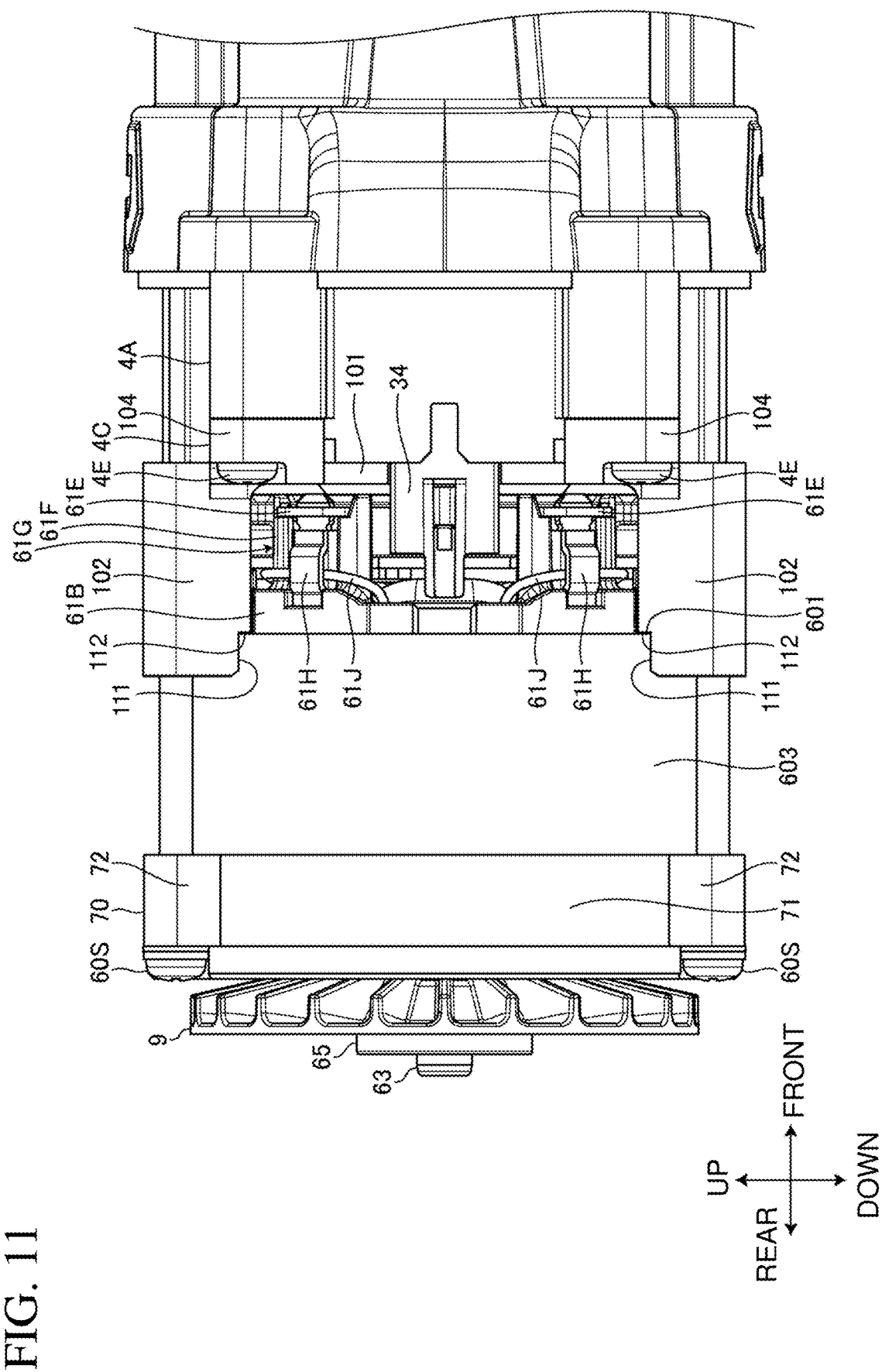
FIG. 11 is a partial top view of the driver drill according to the embodiment.
Figure 12:
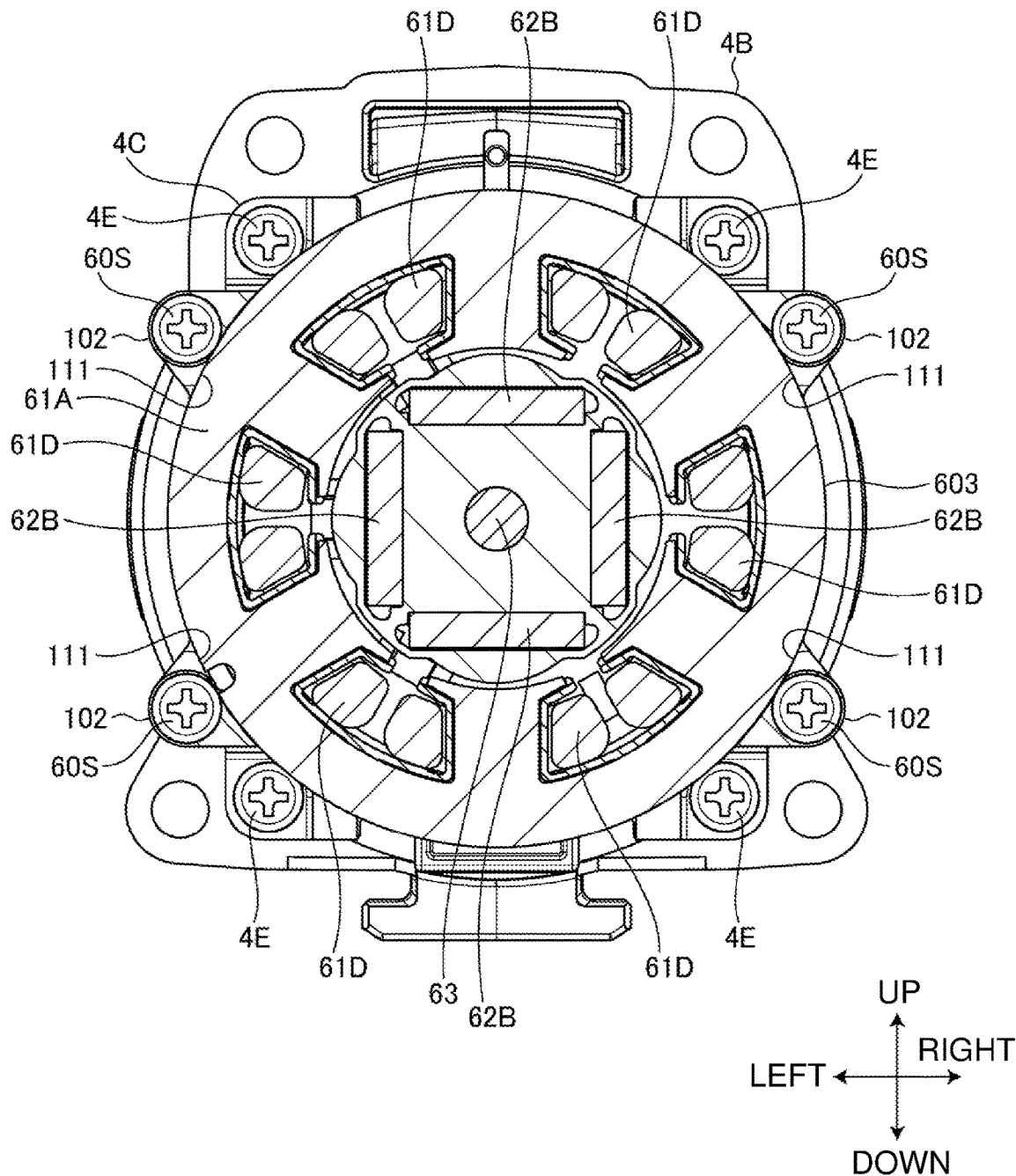
FIG. 12 is a partial sectional view of the driver drill according to the embodiment.
Figure 13:
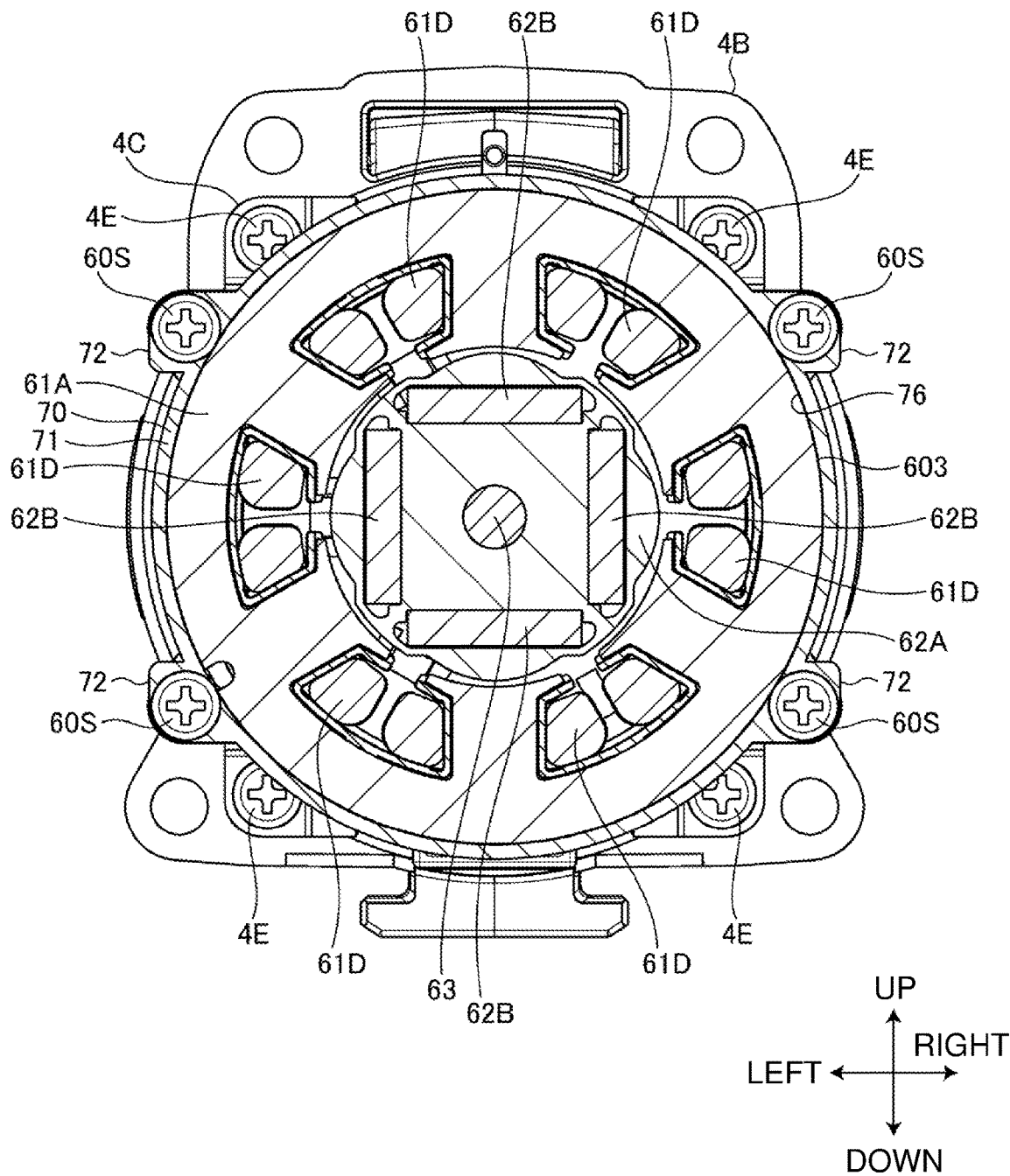
FIG. 13 is a partial sectional view of the driver drill according to the embodiment.
Figure 14:
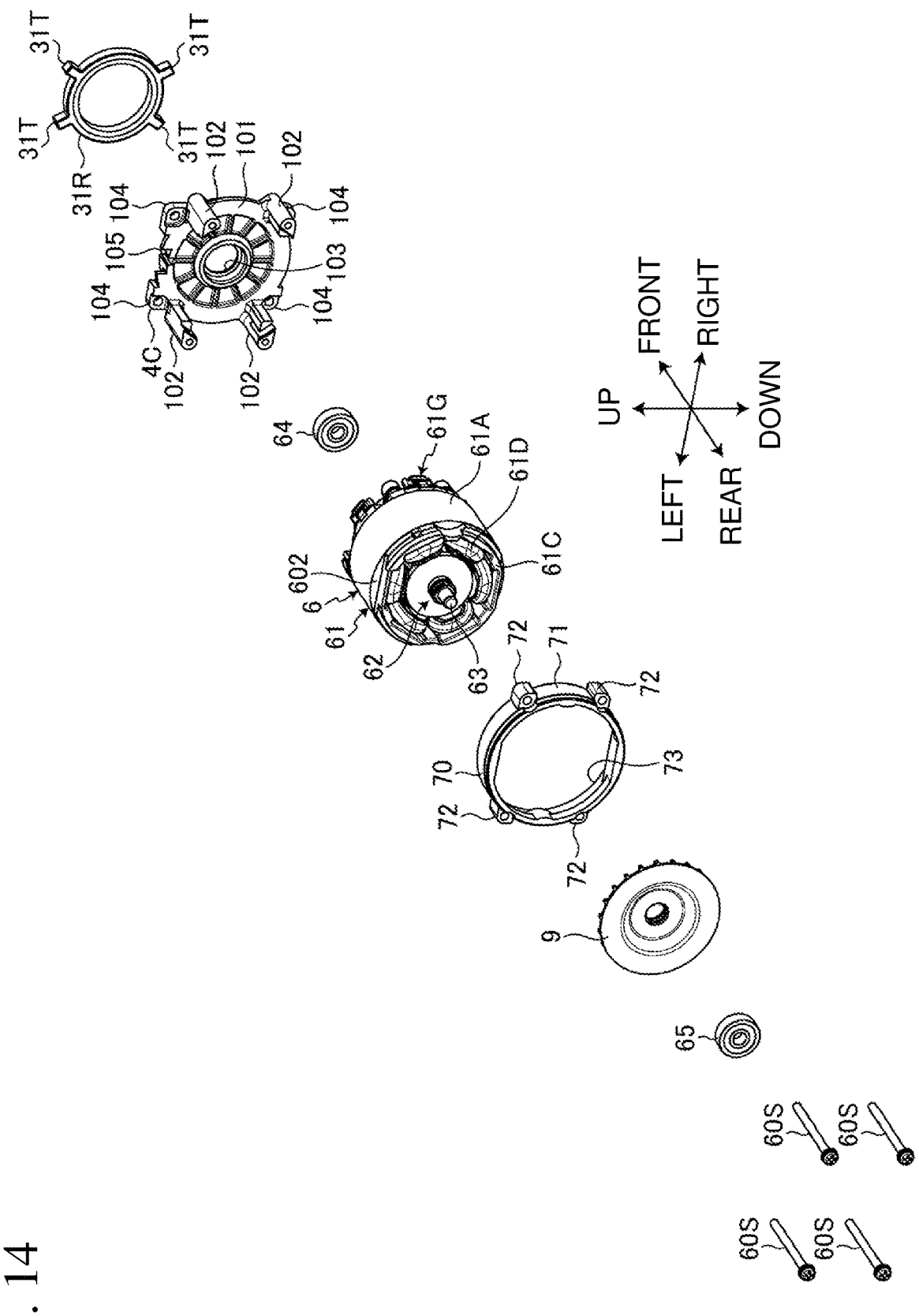
FIG. 14 is a partial front exploded perspective view of the driver drill according to the embodiment.
Figure 15:
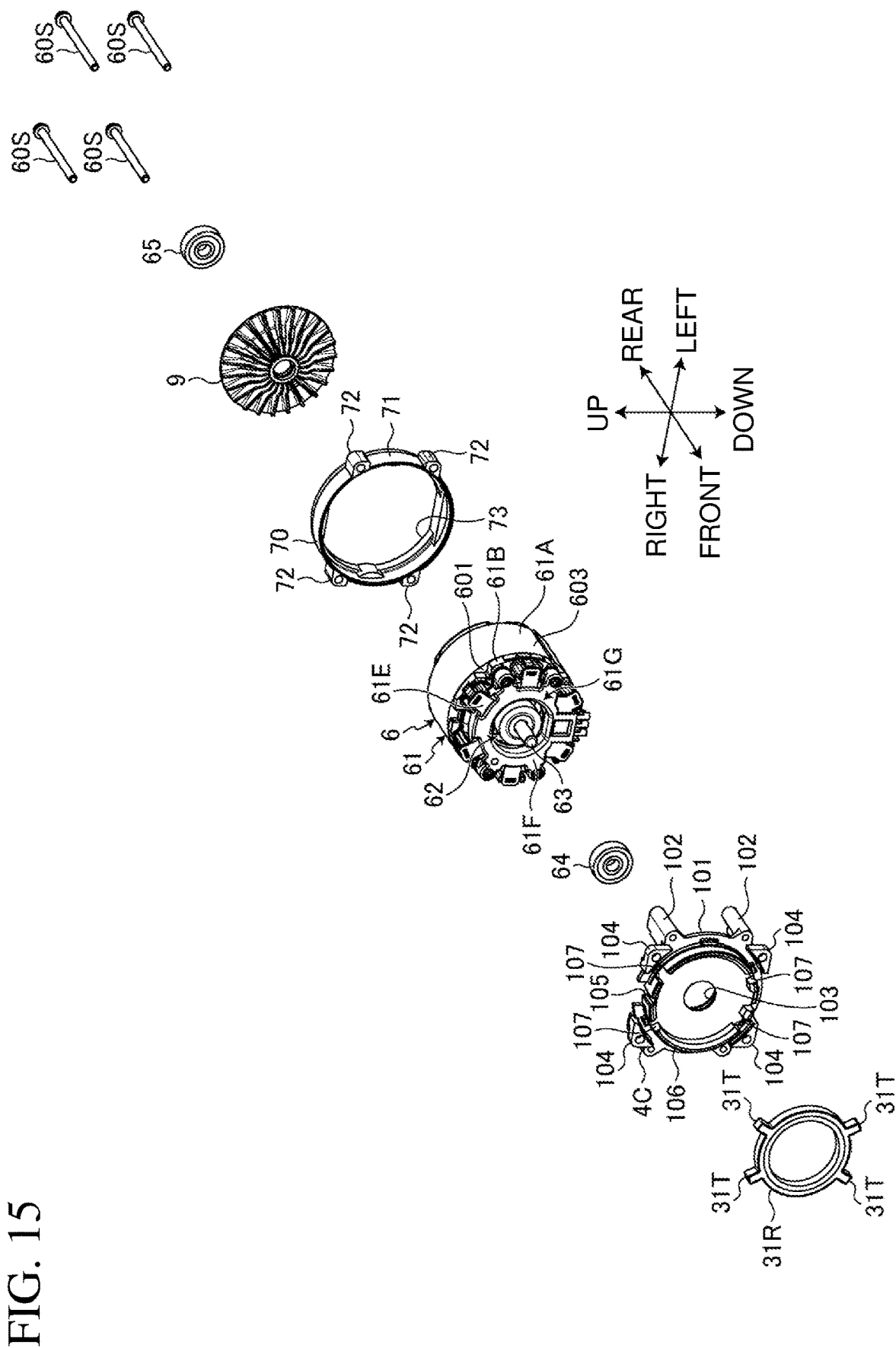
FIG. 15 is a partial rear exploded perspective view of the driver drill according to the embodiment.

FIG. 8 is a partial perspective view of the driver drill 1 according to the embodiment as viewed from the right rear. FIG. 9 is a partial left side view of the driver drill 1. FIG. 10 is a partial rear view of the driver drill 1. FIG. 11 is a partial top view of the driver drill 1. FIG. 12 is a partial sectional view of the driver drill 1. FIG. 13 is a partial sectional view of the driver drill 1. FIG. 14 is a partial front exploded perspective view of the driver drill 1. FIG. 15 is a partial rear exploded perspective view of the driver drill 1.

As shown in FIGS. 5 and 6, the housing 2 in the present embodiment includes the left housing 2L and the right housing 2R. The right housing 2R is fastened to the left housing 2L with the screws 2S. More specifically, the housing 2 has a half-split structure. FIGS. 8 to 15 each show the internal structure of the motor compartment 21. FIG. 12 is a sectional view taken along line A-A in FIG. 9 as viewed in the direction indicated by arrows. FIG. 13 is a sectional view taken along line B-B in FIG. 9 as viewed in the direction indicated by arrows.

As shown in FIGS. 7 to 15, the motor 6 includes the stator 61 and the rotor 62 rotatable relative to the stator 61.

The stator 61 includes the stator core 61A, the front insulator 61B, the rear insulator 61C, the coils 61D, and the busbar unit 61G.

The stator core 61A is cylindrical. The stator core 61A surrounds the rotation axis AX. The stator core 61A has a front end face 601, a rear end face 602, and an outer circumferential surface 603. The front end face 601 faces frontward. The rear end face 602 faces rearward. The front end face 601 and the rear end face 602 are annular. The outer circumferential surface 603 connects the periphery of the front end face 601 and the periphery of the rear end face 602. The outer circumferential surface 603 surrounds the rotation axis AX.

The front insulator 61B is located in front of the stator core 61A. The front insulator 61B partially covers the front end face 601 of the stator core 61A. The stator core 61A includes a partially exposed portion of the front end face 601.

The rear insulator 61C is located behind the stator core 61A. The rear insulator 61C partially covers the rear end face 602 of the stator core 61A. The stator core 61A includes a partially exposed portion of the rear end face 602.

The coils 61D are attached to the stator core 61A with the front insulator 61B and the rear insulator 61C in between. The stator 61 in the embodiment includes six coils 61D.

The busbar unit 61G includes short-circuiting members 61E and a resin member 61F. The resin member 61F covers at least parts of the short-circuiting members 61E. The short-circuiting members 61E are connected to the controller board 17 with lead wires. The short-circuiting members 61E connect the multiple coils 61D with fusing terminals 61H. A pair of the coils 61D are connected to each other with a wire 61J. The fusing terminals 61H are connected to the wires 61J.

The rotor 62 includes the rotor shaft 63, the rotor core 62A, and the permanent magnets 62B.

The rotor core 62A is cylindrical. The rotor core 62A surrounds the rotor shaft 63. The rotor shaft 63 is fixed to the rotor core 62A. The permanent magnets 62B are held by the rotor core 62A. The rotor 62 in the embodiment includes four permanent magnets 62B.

The rotor shaft 63 has the front portion supported by the bearing 64. The rotor shaft 63 has the rear portion supported by the bearing 65. The bearing 64 is a ball bearing. The bearing 65 is a ball bearing. The fan 9 is fixed to the rear portion of the rotor shaft 63. The fan 9 is a centrifugal fan.

The driver drill 1 according to the embodiment includes the bracket 4C (first support), a support 70 (second support), and screws 60S. The bracket 4C supports a front portion of the stator core 61A. The support 70 supports a rear portion of the stator core 61A. Each screw 60S connects the bracket 4C and the support 70.

The bracket 4C is formed from a metal such as iron, aluminum, or magnesium.

The support 70 is formed from a metal such as iron, aluminum, or magnesium.

Figure 16:
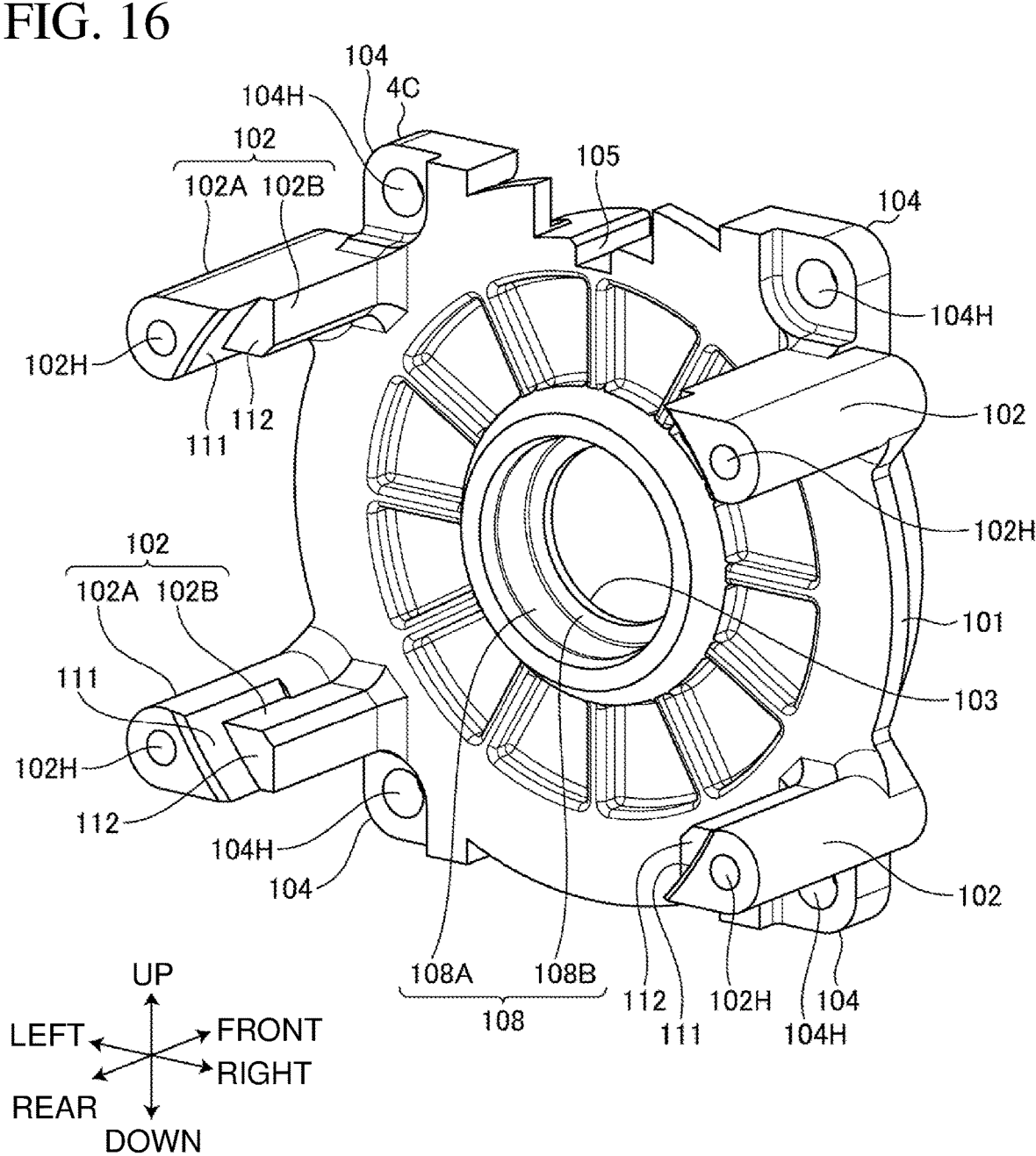
FIG. 16 is a rear perspective view of a bracket in the embodiment.
Figure 17:
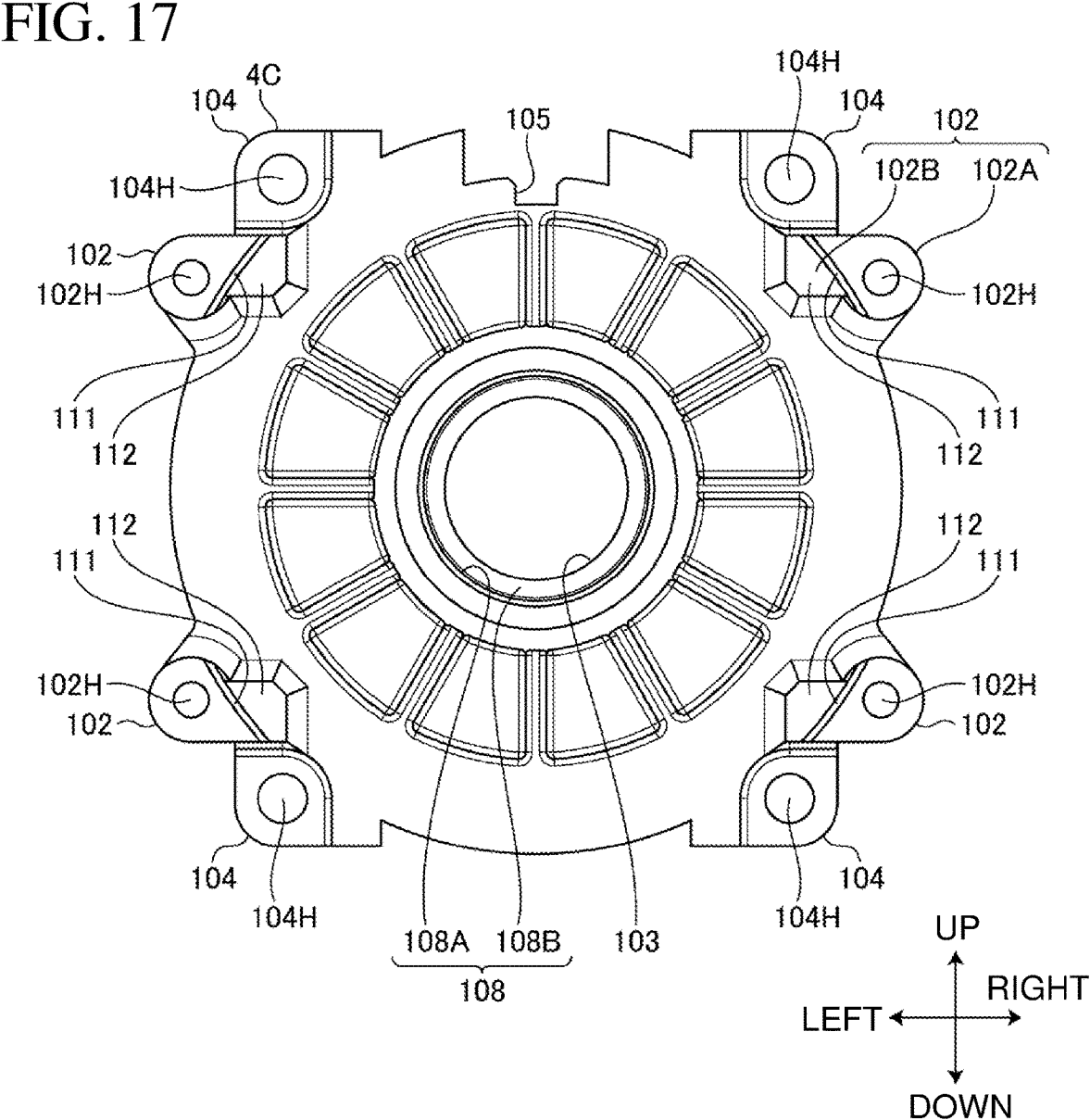
FIG. 17 is a rear view of the bracket in the embodiment.
Figure 18:
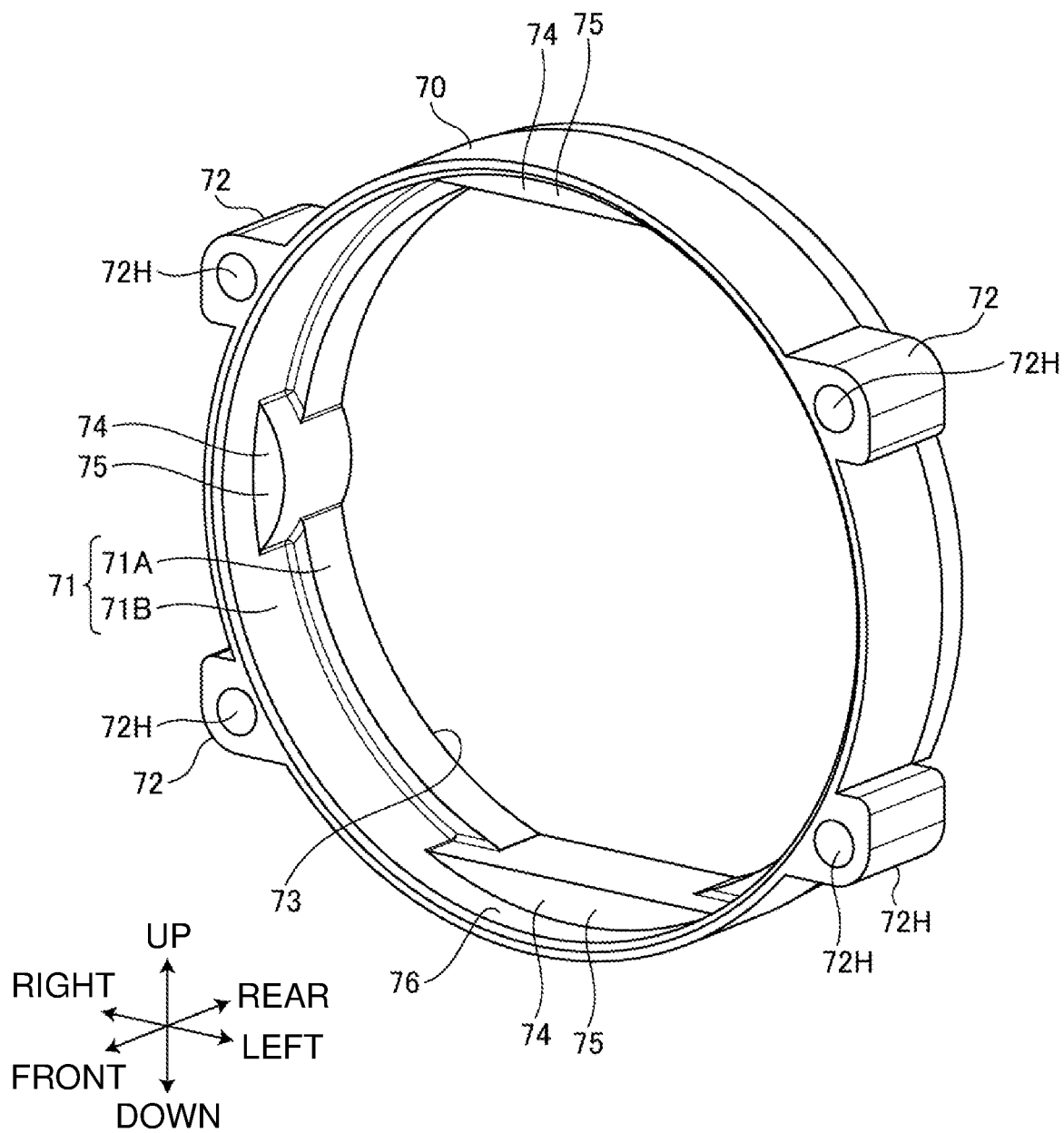
FIG. 18 is a front perspective view of a support in the embodiment.
Figure 19:
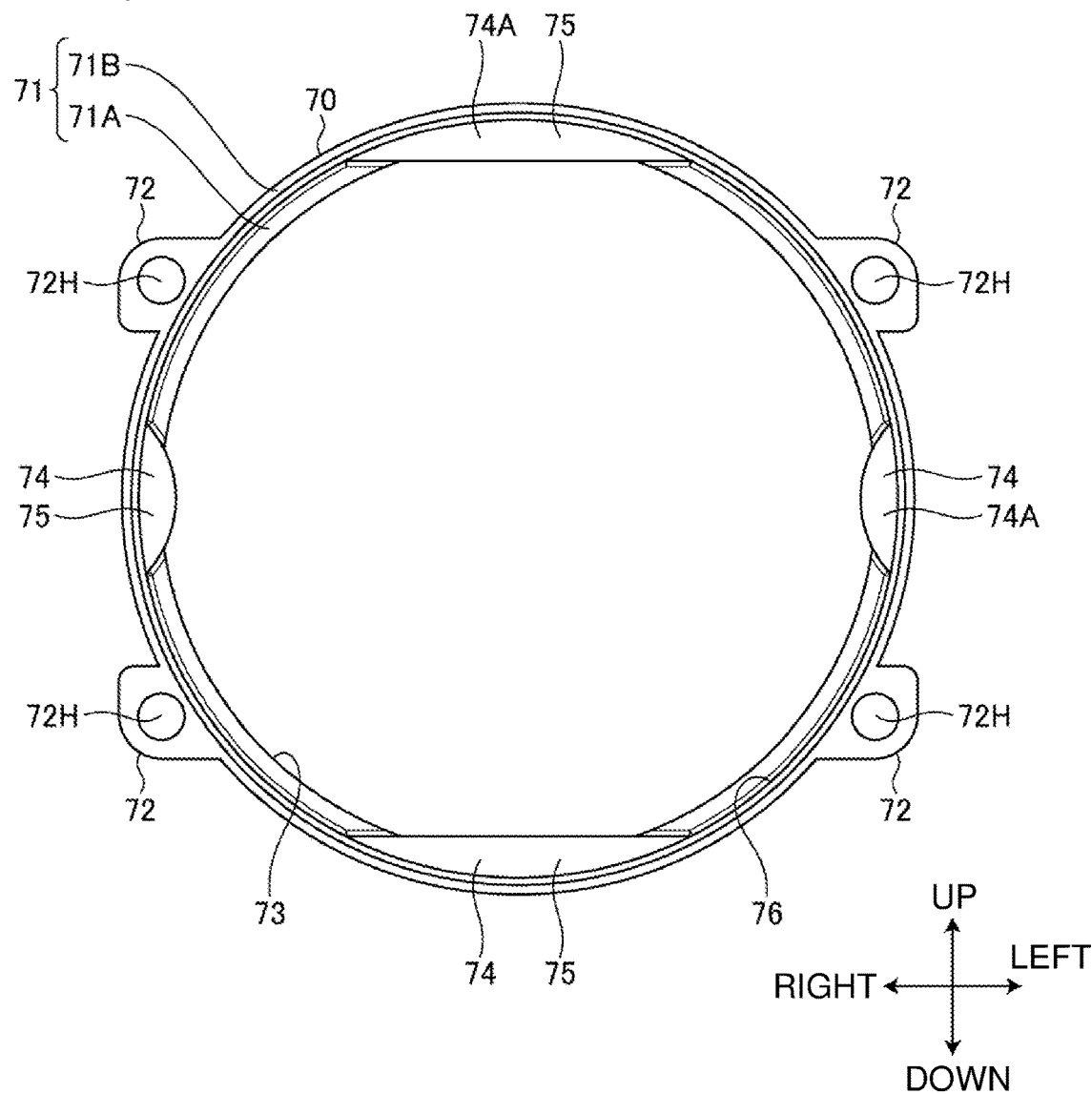
FIG. 19 is a front view of the support in the embodiment.

FIG. 16 is a rear perspective view of the bracket 4C in the embodiment. FIG. 17 is a rear view of the bracket 4C. FIG. 18 is a front perspective view of the support 70. FIG. 19 is a front view of the support 70.

The bracket 4C holds the bearing 64. At least a part of the bracket 4C is in contact with the front end face 601 of the stator core 61A. The bracket 4C includes a plate 101, screw bosses 102, and screw bosses 104.

The plate 101 has an opening 103 in its center. The plate 101 includes a holder 108 holding the bearing 64. The holder 108 has a first holding surface 108A and a second holding surface 108B. The first holding surface 108A is in contact with an outer ring of the bearing 64. The second holding surface 108B is in contact with at least a part of the front end face of the bearing 64. The second holding surface 108B is annular. The second holding surface 108B surrounds the opening 103.

The plate 101 in the embodiment has a notch 105 in its upper portion. The speed switch ring 34 has an upper portion at least partially received in the notch 105.

As shown in FIG. 15, the plate 101 has a peripheral wall 106 on its front surface. The peripheral wall 106 surrounds the opening 103. The internal gear 31R is located inward from the peripheral wall 106. The peripheral wall 106 has recesses 107. The internal gear 31R includes projections 31T on its outer circumferential surface. The projections 31T are received in the recesses 107. This restricts relative rotation between the internal gear 31R and the bracket 4C.

The screw bosses 102 protrude rearward from a peripheral edge of the plate 101. The screws 60S are fastened into the corresponding screw bosses 102. The screw bosses 102 have threaded holes 102H in which threaded portions of the screws 60S are placed.

The bracket 4C has multiple (four in the embodiment) screw bosses 102 located circumferentially at intervals.

The screw bosses 104 are arranged on the peripheral edge of the plate 101. Each screw boss 104 has an opening 104H for receiving a middle portion of the screw 4E.

The bracket 4C has multiple (four in the embodiment) screw bosses 104 located circumferentially at intervals.

The bracket 4C has contact surfaces 112 (first contact surface) and contact surfaces 111 (third contact surface). The contact surfaces 112 are in contact with the front end face 601 of the stator core 61A. The contact surfaces 111 are in contact with the outer circumferential surface 603 of the stator core 61A.

The contact surfaces 112 face rearward. The contact surfaces 112 are in contact with the front end face 601 of the stator core 61A. The bracket 4C has the multiple (four in the embodiment) contact surfaces 112 located circumferentially at intervals.

The contact surfaces 111 face radially inward. The contact surfaces 111 are in contact with a front portion of the outer circumferential surface 603 of the stator core 61A. The bracket 4C has the multiple (four in the embodiment) contact surfaces 111 located circumferentially at intervals.

The contact surfaces 112 and the contact surfaces 111 are located in the screw bosses 102. Each contact surface 112 is located in the corresponding screw boss 102. Each contact surface 111 is located in the corresponding screw boss 102. The contact surfaces 111 are located rearward from the contact surfaces 112 in the screw bosses 102.

Each screw boss 102 in the embodiment includes a first portion 102A and a second portion 102B. The second portion 102B is located radially inward from the first portion 102A. The first portion 102A has a rear end rearward from a rear end of the second portion 102B. The contact surface 112 includes a rear end face of the second portion 102B. The contact surface 112 is located rearward from the second portion 102B and includes an inner side surface of the first portion 102A facing radially inward.

As described above, the front insulator 61B partially covers the front end face 601 of the stator core 61A. The stator core 61A includes the partially exposed portion of the front end face 601. The front end face 601 includes at least four exposed portions. The four contact surfaces 112 are in contact with the exposed portions of the front end face 601.

At least a part of the support 70 is in contact with the rear end face 602 of the stator core 61A. The support 70 includes a ring 71, screw bosses 72, and protrusions 74.

The ring 71 includes a first ring 71A and a second ring 71B. The first ring 71A is located rearward from the second ring 71B. The first ring 71A has a smaller inner diameter than the second ring 71B. The first ring 71A has an opening 73 at its rear end.

The screw bosses 72 are located on an outer circumferential surface of the ring 71. Each screw boss 72 has an opening 72H for receiving a middle portion of the screw 60S.

The support 70 has multiple (four in the embodiment) screw bosses 72 located circumferentially at intervals.

The protrusions 74 protrude radially inward from an inner circumferential surface of the ring 71. The support 70 includes multiple (four in the embodiment) protrusions 74 located circumferentially at intervals. The protrusions 74 have front ends located rearward from the front ends of the ring 71 (second ring 71B).

The support 70 has contact surfaces 75 (second contact surface) and a contact surface 76 (fourth contact surface). The contact surfaces 75 are in contact with a rear end face 602 of the stator core 61A. The contact surface 76 is in contact with the outer circumferential surface 603 of the stator core 61A.

The contact surfaces 75 face frontward. The contact surfaces 75 are in contact with a rear end face 602 of the stator core 61A. The support 70 has multiple (four in the embodiment) contact surfaces 75 located circumferentially at intervals.

The contact surface 76 faces radially inward. The contact surface 76 is in contact with a rear portion of the outer circumferential surface 603 of the stator core 61A. The contact surface 76 surrounds the outer circumferential surface 603 of the stator core 61A.

The contact surfaces 75 are located in the protrusions 74. The contact surface 76 is located in the ring 71. The contact surface 76 includes a portion of an inner circumferential surface of the second ring 71B located frontward from the protrusions 74.

As described above, the rear insulator 61C partially covers the rear end face 602 of the stator core 61A. The stator core 61A includes the partially exposed portion of the rear end face 602. The rear end face 602 has at least four exposed portions. The four contact surfaces 75 are each in contact with the exposed portions of the rear end face 602.

The bracket 4C and the support 70 are connected with the screws 60S to fasten the stator core 61A to the bracket 4C and the support 70 in the front-rear direction.

The driver drill 1 according to the embodiment includes the four screws 60S arranged circumferentially at intervals. The screws 60S are placed in the openings 72H in the support 70 from the rear of the support 70. The screws 60S have the middle portions received in the openings 72H, and thus their threaded portions are placed in the threaded holes 102H in the bracket 4C. The screws 60S are fastened to the bracket 4C with the support 70 to fasten the bracket 4C and the support 70 to the stator core 61A.

The four screws 60S are screwed into the threaded holes 102H to shorten the distance between the bracket 4C and the support 70 in the front-rear direction. The screws 60S are pulled in the axial direction (front-rear direction) to generate an axial force, thus fastening the bracket 4C and the support 70 to the stator core 61A. With the axial force generated by the screws 60S, the stator core 61A is fastened to the bracket 4C and the support 70 in the front-rear direction. More specifically, the stator core 61A is compressed in the front-rear direction under compressive stress from the bracket 4C and the support 70.

With the screws 60S screwed into the threaded holes 102H and the bracket 4C and the support 70 fastened to the stator core 61A, the rear insulator 61C and the busbar unit 61G are located inward from the first ring 71A. The rotor shaft 63 has its front end located inside the casing 4 through the opening 103 of the bracket 4C.

As shown in FIGS. 9 to 11, with the screws 60S screwed into the threaded holes 102H and the bracket 4C and the support 70 fastened to the stator core 61A, the support 70 has its rear end located frontward from the fan 9. The screws 60S also have their rear ends located frontward from the fan 9.

With the screws 60S screwed into the threaded holes 102H and the bracket 4C and the support 70 fastened to the stator core 61A, the bracket 4C has its rear end apart from the front end of the support 70. The bracket 4C has its rear end including the rear ends of the screw bosses 102 (first portion 102A). The support 70 has its front end including the front end of the ring 71 (second ring 71B).

The driver drill 1 according to the embodiment includes the motor 6, the output unit 8, the bracket 4C (first support), the support 70 (second support), and the screws 60S. The motor 6 includes the stator 61 including the stator core 61A and the coils 61D attached to the stator core 61A, and the rotor 62 including the rotor core 62A and the rotor shaft 63 fixed to the rotor core 62A. The output unit 8 is located frontward from the motor 6 and rotatable with a rotational force from the motor 6. The bracket 4C has the contact surfaces 112 (first contact surface) in contact with the front end face 601 of the stator core 61A. The support 70 has the contact surfaces 75 (second contact surface) in contact with the rear end face 602 of the stator core 61A. The bracket 4C and the support 70 are connected with the screws 60S to fasten the stator core 61A to the bracket 4C and the support 70 in the front-rear direction.

The above structure reduces noise caused by resonance of the stator core 61A. The stator core 61A fastened to the bracket 4C and the support 70 in the front-rear direction has higher rigidity. This increases the resonant frequency of the stator core 61A. For the stator core 61A with a low resonant frequency, the rotation of the rotor 62 is likely to cause the stator core 61A to resonate. In the present embodiment, the stator core 61A has a higher resonant frequency, and thus is less likely to resonate. This structure causes less noise from resonance of the stator core 61A, and thus reduces noise from the driver drill 1.

The driver drill 1 according to the embodiment includes the housing 2 including the motor compartment 21 accommodating the motor 6, the bracket 4C, the support 70, and the screws 60S. The housing 2 is formed from a synthetic resin. The housing 2 includes the left housing 2L and the right housing 2R fixed to the left housing 2L.

In this structure, the housing 2 has a half-split structure. This improves the workability in accommodating the motor 6, the bracket 4C, the support 70, and the screws 60S into the motor compartment 21.

In the embodiment, the bracket 4C includes the rear end apart from the front end of the support 70.

The driver drill 1 can thus be compact and lightweight.

The bracket 4C in the embodiment has the multiple contact surfaces 112 located circumferentially at intervals.

The driver drill 1 can thus be compact and lightweight.

The bracket 4C in the embodiment has the contact surfaces 111 (third contact surface) in contact with the outer circumferential surface 603 of the stator core 61A.

The outer circumferential surface 603 of the stator core 61A is supported by the bracket 4C to reduce misalignment between the central axis of the stator 61 and the rotation axis of the rotor 62. The bracket 4C supports the rotor 62 including the rotor shaft 63 with the bearing 64 in between. The bracket 4C also supports the stator 61 including the stator core 61A. More specifically, the bracket 4C supports both the stator 61 and the rotor 62. This reduces misalignment between the central axis of the stator 61 and the rotation axis of the rotor 62. In this manner, the stator 61 is less likely to come in contact with the rotor 62.

The bracket 4C in the embodiment has the multiple contact surfaces 111 located circumferentially at intervals.

The driver drill 1 can thus be compact and lightweight.

The driver drill 1 according to the embodiment includes the bearing 64 supporting the front portion of the rotor shaft 63. The bracket 4C holds the bearing 64.

In the above structure, the bracket 4C supports both the stator 61 and the rotor 62. This reduces misalignment between the central axis of the stator 61 and the rotation axis of the rotor 62. In this manner, the stator 61 is less likely to come in contact with the rotor 62. This structure reduces misalignment between the central axis of the stator 61 and the rotation axis of the rotor 62, thus narrowing an air gap that is a clearance between the stator core 61A and the rotor core 62A. The motor 6 is expected to achieve high output power.

The bracket 4C in the embodiment includes the plate 101 with the holder 108 holding the bearing 64, and the screw bosses 102 protruding rearward from the peripheral edge of the plate 101 and receiving the screws 60S. The contact surfaces 112 are located in the screw bosses 102.

The stator core 61A is appropriately fastened to the bracket 4C and the support 70 in the front-rear direction.

The bracket 4C in the embodiment includes the multiple screw bosses 102 located circumferentially at intervals. The contact surfaces 112 are located in the screw bosses 102.

The driver drill 1 can thus be compact and lightweight.

The bracket 4C in the embodiment has the contact surfaces 111 in contact with the outer circumferential surface 603 of the stator core 61A. The contact surfaces 111 are located rearward from the contact surfaces 112 in the screw bosses 102.

In this manner, the outer circumferential surface 603 of the stator core 61A is supported by the screw bosses 102. This reduces misalignment between the central axis of the stator 61 and the rotation axis of the rotor 62.

The support 70 in the embodiment has the multiple contact surfaces 75 located circumferentially at intervals.

The driver drill 1 can thus be compact and lightweight.

The support 70 in the embodiment has the contact surface 76 (fourth contact surface) in contact with the outer circumferential surface 603 of the stator core 61A.

In this manner, the outer circumferential surface 603 of the stator core 61A is supported by the support 70. This reduces misalignment between the central axis of the stator 61 and the rotation axis of the rotor 62.

The contact surface 76 in the embodiment surrounds the outer circumferential surface 603 of the stator core 61A.

In this manner, the outer circumferential surface 603 of the stator core 61A is appropriately supported by the support 70.

The support 70 in the embodiment includes the ring 71 surrounding the outer circumferential surface 603 of the stator core 61A, and the protrusions 74 protruding radially inward from the inner circumferential surface of the ring 71. The contact surfaces 75 are located in the protrusions 74.

The stator core 61A is appropriately fastened to the bracket 4C and the support 70 in the front-rear direction.

The contact surfaces 75 in the embodiment include the multiple protrusions 74 located circumferentially at intervals. The contact surfaces 75 are located in the protrusions 74.

The driver drill 1 can thus be compact and lightweight.

The support 70 in the embodiment has the contact surface 76 in contact with the outer circumferential surface 603 of the stator core 61A. The contact surface 76 includes a portion of the inner circumferential surface of the ring 71 (second ring 71B) located frontward from the protrusions 74.

In this manner, the outer circumferential surface 603 of the stator core 61A is supported by the ring 71 (second ring 71B). This reduces misalignment between the central axis of the stator 61 and the rotation axis of the rotor 62.

The driver drill 1 according to the embodiment includes the four screws 60S arranged circumferentially at intervals.

This structure allows an axial force from the four screws 60S to be applied to the stator core 61A in a well-balanced manner.

The driver drill 1 according to the embodiment includes the fan 9 fixed to the rear portion of the rotor shaft 63. The support 70 includes the rear end located frontward from the fan 9.

When the support 70 surrounds the fan 9 that is a centrifugal fan, blade rotational noise (NZ noise) may occur. In the embodiment, the fan 9 is not surrounded by the support 70, and thus is less likely to generate noise.

The screws 60S in the embodiment include the rear ends located frontward from the fan 9.

In the embodiment, the fan 9 that is a centrifugal fan is not surrounded by the screws 60S, and thus is less likely to generate noise.

The bracket 4C in the embodiment is formed from a metal.

When the bracket 4C is formed from, for example, a synthetic resin, the bracket 4C may deform in response to changes in the environment in which the driver drill 1 is used (humidity or temperature). More specifically, the bracket 4C formed from a synthetic resin may deform with moisture absorption or heat. This may cause misalignment between the central axis of the stator 61 and the rotation axis of the rotor 62.

In the embodiment, the bracket 4C is less likely to deform, and reduces misalignment between the central axis of the stator 61 and the rotation axis of the rotor 62.

The support 70 in the embodiment is formed from a metal.

This structure reduces deformation of the support 70 in response to changes in the environment in which the driver drill 1 is used (humidity or temperature).

Other Embodiments

Figure 20:
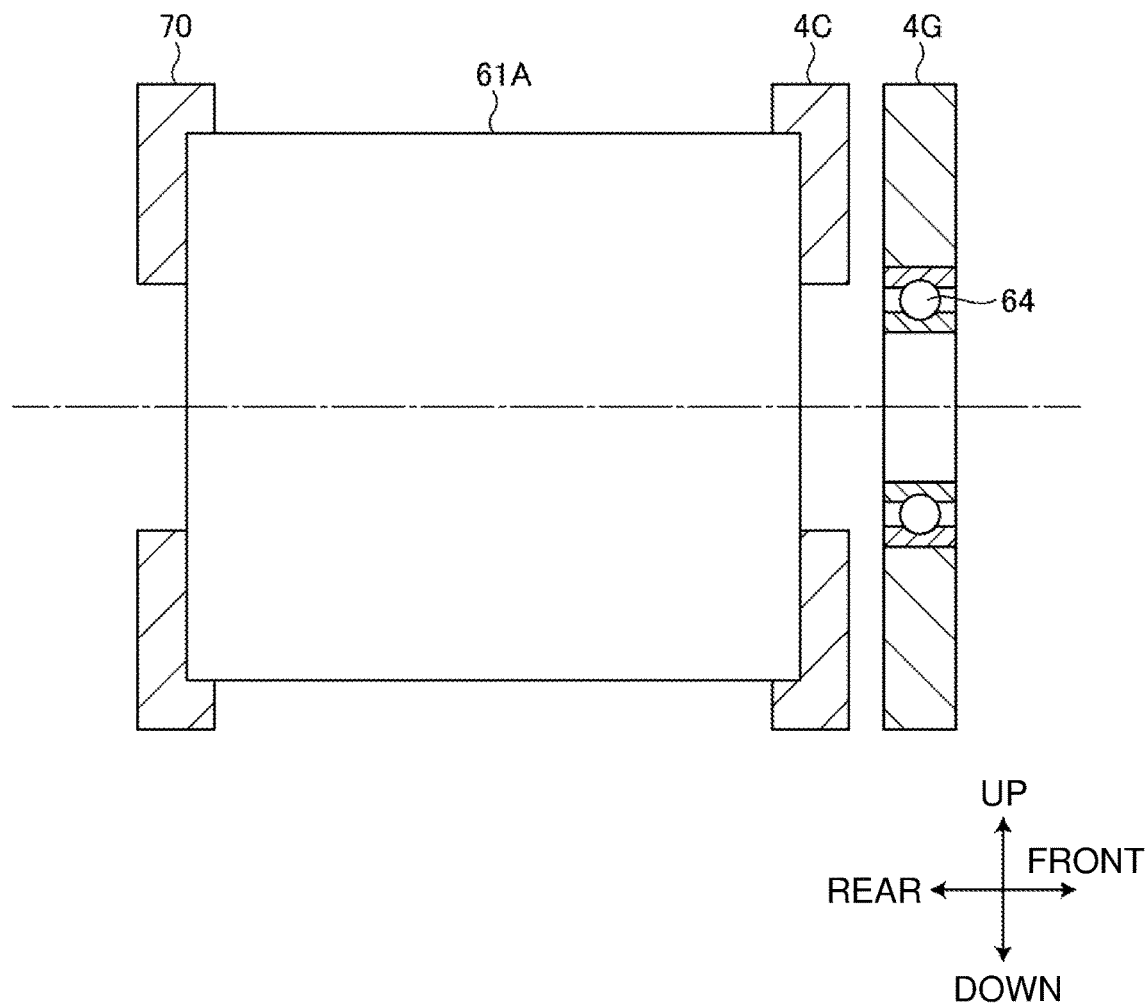
FIG. 20 is a schematic partial sectional view of a driver drill according to another embodiment.

FIG. 20 is a schematic partial sectional view of a driver drill 1 according to another embodiment. In the above embodiment, the stator core 61A is located between the bracket 4C and the support 70 in the front-rear direction. The bracket 4C holds the bearing 64. As shown in FIG. 20, a bracket 4C may not hold a bearing 64. In the example shown in FIG. 20, the bearing 64 is held in a bearing retainer 4G separate from the bracket 4C. A stator core 61A is located between the bracket 4C and a support 70 in the front-rear direction. This reduces noise caused by the resonance of the stator core 61A. The bracket 4C without holding the bearing 64 can avoid size increase and thus can reduce the weight of the driver drill.

The electric work machine according to the above embodiments is a driver drill (vibration driver drill), which is an example of a power tool. The power tool is not limited to a driver drill. Examples of the power tool include an impact driver, an angle drill, a screwdriver, a hammer, a hammer drill, a circular saw, and a reciprocating saw.

The electric work machine according to the above embodiments may be outdoor power equipment. Examples of the outdoor power equipment include a chain saw, a mowing machine, a lawnmower, a hedge trimmer, and a blower.

REFERENCE SIGNS LIST 1 driver drill
2 housing
2L left housing
2R right housing
2S screw
3 rear cover
3S screw
4 casing
4A first casing
4B second casing
4C bracket (first support)
4D stop plate
4E screw
4F screw
4S screw
5 battery mount
6 motor
7 power transmission
8 output unit
9 fan
10 trigger lever
11 forward-reverse switch lever
12 speed switch lever
13 mode switch ring
14 light
15 interface panel
16 dial
17 controller board
18 inlet
19 outlet
20 battery pack
21 motor compartment
22 grip
23 battery holder
24 operation unit
24 display
26 controller case
27 panel opening
28 dial opening
30 reducer
31 first planetary gear assembly
31A pin
31C first carrier
31P planetary gear
31R internal gear
31T projection
31S pinion gear
32 second planetary gear assembly
32A pin
32C second carrier
32P planetary gear
32R internal gear
32S sun gear
33 third planetary gear assembly
33A pin
33C third carrier
33P planetary gear
33R internal gear
33S sun gear
34 speed switch ring
35 connection ring
39 coil spring
40 vibrator
41 first cam
42 second cam
43 vibration switch ring
43S opposing portion
43T projection
44 stop ring
45 support ring
46 steel ball
47 washer
48 cam ring
50 spindle locking assembly
51 lock cam
52 lock ring
60S screw
61 stator
61A stator core
61B front insulator
61C rear insulator
61D coil
61E short-circuiting member
61F resin member
61G busbar unit
61H fusing terminal
61J wire
62 rotor
62A rotor core
62B permanent magnet
63 rotor shaft
64 bearing 65 bearing
70 support (second support)
71 ring
71A first ring
71B second ring
72 screw boss
72H opening
73 opening
74 protrusion
75 contact surface (second contact surface)
76 contact surface (fourth contact surface)
81 spindle
81F flange
81R threaded hole
82 chuck
83 bearing
84 bearing
87 coil spring
90 rotation sensor board
101 plate
102 screw boss
102A first portion
102B second portion
102H threaded hole
103 opening
104 screw boss
104H opening
105 notch
106 peripheral wall
107 recess
108 holder
108A first holding surface
108B second holding surface
111 contact surface (third contact surface)
112 contact surface (first contact surface)
601 front end face
602 rear end face
603 outer circumferential surface
AX rotation axis

What is claimed is:

1. An electric work machine, comprising:
    a motor including
        a stator including a stator core and coils attached to the stator core, and
        a rotor including a rotor core and a rotor shaft fixed to the rotor core;
    an output unit located frontward from the motor and rotatable with a rotational force from the motor;
    a first support having a first contact surface in contact with a front end face of the stator core;
    a second support having a second contact surface in contact with a rear end face of the stator core; and
    a screw connecting the first support and the second support and fastening the stator core to the first support and the second support in a front-rear direction,
    wherein the first support includes
        a plate, and
        a screw boss protruding rearward from a peripheral edge of the plate and receiving the screw, and
    the first contact surface is located in the screw boss.

2. The electric work machine according to claim 1, further comprising:
    a housing including a motor compartment accommodating the motor, the first support, the second support, and the screw, the housing comprising a synthetic resin, the housing including a left housing and a right housing fixed to the left housing.

3. The electric work machine according to claim 1, wherein the first support includes a rear end apart from a front end of the second support.

4. The electric work machine according to claim 1, wherein
    the first support has a plurality of the first contact surfaces located circumferentially at intervals.

5. The electric work machine according to claim 1, wherein
    the first support has a third contact surface in contact with an outer circumferential surface of the stator core.

6. The electric work machine according to claim 5, wherein
    the first support has a plurality of third contact surfaces located circumferentially at intervals.

7. The electric work machine according to claim 1, further comprising:
    a bearing supporting a front portion of the rotor shaft,
    wherein the first support holds the bearing.

8. The electric work machine according to claim 7, wherein
    the plate includes a holder holding the bearing.

9. The electric work machine according to claim 8, wherein
    the first support includes a plurality of the screw bosses located circumferentially at intervals, and
    the first contact surface is located in each of the plurality of screw bosses.

10. The electric work machine according to claim 8, wherein
    the first support has a third contact surface in contact with an outer circumferential surface of the stator core, and
    the third contact surface is located rearward from the first contact surface in the screw boss.

11. The electric work machine according to claim 1, wherein
    the second support has a plurality of the second contact surfaces located circumferentially at intervals.

12. The electric work machine according to claim 1, wherein
    the second support has a fourth contact surface in contact with an outer circumferential surface of the stator core.

13. The electric work machine according to claim 12, wherein
    the fourth contact surface surrounds the outer circumferential surface of the stator core.

14. An electric work machine, comprising:
    a motor including
        a stator including a stator core and coils attached to the stator core, and
        a rotor including a rotor core and a rotor shaft fixed to the rotor core;
    an output unit located frontward from the motor and rotatable with a rotational force from the motor;
    a first support having a first contact surface in contact with a front end face of the stator core;
    a second support having a second contact surface in contact with a rear end face of the stator core; and
    a screw connecting the first support and the second support and fastening the stator core to the first support and the second support in a front-rear direction,
    wherein
    the second support includes
        a ring surrounding an outer circumferential surface of the stator core, and
        a protrusion protruding radially inward from an inner circumferential surface of the ring, and
    the second contact surface is located in the protrusion.

15. The electric work machine according to claim 14, wherein
the protrusion includes a plurality of the protrusions located circumferentially at intervals,
the second contact surface includes a plurality of the second contact surfaces, and
each of the plurality of second contact surfaces is located in each of the plurality of protrusions.

16. The electric work machine according to claim 14, wherein
the second support has a fourth contact surface in contact with the outer circumferential surface of the stator core, and
the fourth contact surface includes a portion of the inner circumferential surface of the ring located frontward from the protrusion.

17. The electric work machine according to claim 1, wherein
the electric work machine includes four of the screws arranged circumferentially at intervals.

18. The electric work machine according to claim 1, further comprising:
a fan fixed to a rear portion of the rotor shaft,
wherein the second support includes a rear end located frontward from the fan.

19. The electric work machine according to claim 18, wherein
the screw includes a rear end located frontward from the fan.

20. The electric work machine according to claim 1, wherein
the first support is formed of a metal, and
the second support is formed of a metal.

* * * * *